US006714939B2

(12) United States Patent
Saldanha et al.

(10) Patent No.: US 6,714,939 B2
(45) Date of Patent: Mar. 30, 2004

(54) CREATION OF STRUCTURED DATA FROM PLAIN TEXT

(75) Inventors: Alexander Saldanha, El Cerrito, CA (US); Patrick C. McGeer, Orinda, CA (US); Luca Carloni, Berkeley, CA (US)

(73) Assignee: Softface, Inc., Walnut Creek, CA (US)

( * ) Notice: Subject to any disclaimer, the term of this patent is extended or adjusted under 35 U.S.C. 154(b) by 293 days.

(21) Appl. No.: 09/757,075

(22) Filed: Jan. 8, 2001

(65) Prior Publication Data

US 2003/0167266 A1 Sep. 4, 2003

(51) Int. Cl.[7] .................................................. G06F 17/00

(52) U.S. Cl. ........................... 707/102; 707/101; 707/6; 704/9

(58) Field of Search ................................. 707/101, 102, 707/203, 6; 715/513; 704/9

(56) References Cited

U.S. PATENT DOCUMENTS

| | | | | |
|---|---|---|---|---|
| 5,309,359 A | | 5/1994 | Katz et al. | 707/102 |
| 5,404,295 A | | 4/1995 | Katz et al. | 707/2 |
| 5,680,619 A | | 10/1997 | Gudmundson et al. | 717/108 |
| 5,855,020 A | | 12/1998 | Kirsch | 707/10 |
| 5,920,854 A | | 7/1999 | Kirsch et al. | 707/3 |
| 5,930,746 A | * | 7/1999 | Ting | 704/9 |
| 5,940,821 A | | 8/1999 | Wical | 707/3 |
| 6,138,098 A | * | 10/2000 | Shieber et al. | 704/257 |
| 6,182,029 B1 | * | 1/2001 | Friedman | 704/9 |
| 6,272,495 B1 | * | 8/2001 | Hetherington | 707/101 |

FOREIGN PATENT DOCUMENTS

| | | | | |
|---|---|---|---|---|
| JP | 2000207397 | | 7/2000 | G06F/17/27 |
| WO | WO 200063783 A1 | * | 10/2000 | G06F/7/00 |

OTHER PUBLICATIONS

O'Donnell et al.; "A Linguistic Approach to Information Retrieval"; 1996; Taylor Graham, London, UK; Proceedings of the 16th Research Colloquium of the British Computer Information Retrieval Specialist Group, BCSIRSG p. 68–80.*

Dowding et al.; "A Dynamic Translator for Rule Pruning in Restriction Grammar"; 1998; Natural Language Understanding and Logic Programming, II. Proceedings of the Second International Workshop, Vancouver, BC, Canada, Aug. 17–19, 1987, p. 79–92.*

Metzler et al.; "Conjunction, Ellipsis, and Other Discontinuous Constituents in the Constituent Object Parser"; 1990; InformationProcessing & Management v26n1 pp:53–71, 1990; ISSN 0306–4573.*

Reilly, "Connectionist Technique for On–line Parsing"; Oct. 1991; Network–Compuitation–in–Neural–Sustems (UK), vol. 3, No. 1, p. 37–45, Feb. 1992; ISSN 0954–898X.*

Tomita; "LR Parsers for Natural Languages"; 1984; Proceedings of the Conference 22nd.; Assoc. for Computational Linguistics, Menlo Park, CA, USA, P354–357.*

(List continued on next page.)

*Primary Examiner*—Kim Vu
*Assistant Examiner*—Gwen Liang
(74) *Attorney, Agent, or Firm*—Fenwick & West LLP

(57) ABSTRACT

A method and system for converting plain text into structured data. Parse trees for the plain text are generated based on the grammar of a natural language, the parse trees are mapped on to instance trees generated based on an application-specific model. The best map is chosen, and the instance tree is passing to an application for execution. The method and system can be used both for populating a database and/or for retrieving data from a database based on a query.

23 Claims, 13 Drawing Sheets

OTHER PUBLICATIONS

Robinson; "Diagram: A Grammar for Dialogues"; Jan. 1982; SRI International, Menlo Park, CA. Corp. Source Codes 055876000; Report No. SRI–TN–205, Feb. 80 73p.*

Arens, Y., Knoblock, C. A., and Shen, W., "Query Reformulation for Dynamic Information Integration," Journal of Intelligent Information Systems, vol. 6, #2/3, 1996, pp. 99–130.

Brachman, R. J., "On the Epistemological Status of Semantic Networks," Associational Representations, pp. 191–215, (Appeared in Associative Networks: Representation and Use of Knowledge by Computers, Academic Press, pp. 3–50, 1979).

Brachman, R. J., Fikes, R. E., and Levesque, H. J., "Krypton: A Functional Approach to Knowledge Representation," Readings in Knowledge Representation, pp. 411–429, 1985, (originally published in IEEE Computer 16(10), pp. 67–73, 1983).

Fahlman, S. E., "NETL A system for Representing and Using Real–World Knowledge," The MIT Press, Chapter 1, Section 1.1 to Chapter 3. Section 3.2, pp. 1–78, 1979.

Perkowitz, M., and Etzioni, O., "Category Translation: Learning to Understand Information on the Internet," IJCAI–95 Paper, Aug. 20–25, 1995, Montreal, Canada, pp. 930–936.

Shapiro, S. C., and Rapaport, W. J., "SNePS Considered as a Fully Intensional Propositional Semantic Network," Proceedings AAAI–86: Fifth National Conference on Artifical Intelligence, vol. 1, Aug. 11–15, 1986, pp. 278–283.

* cited by examiner

System Architecture

Components of the
Content Engine

Content Engine

Parse trees for "The boy helped the girl with the suitcase"

"With the suitcase" modifies "help"

"With the suitcase" modifies "the girl"

Parse DAG for "The boy helped the girl with the suitcase"
"With the suitcase" modifies either "help" and "the girl"

Generation of
Instance Trees

Pruning of Instance Trees

Flowchart illustrating DML generation

Populate a Database

Query a Database

Invoke and Application

CREATION OF STRUCTURED DATA FROM PLAIN TEXT

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

REFERENCE TO A COMPUTER PROGRAM LISTING APPENDIX

A computer program listing appendix is included in the attached CD-R created on Dec. 12, 2000, labeled "Creation of Structured Data from Plain Text," and including the following files: CommodityProperty.nml (13 KB), DefaultSeg14Result.xml, (2 KB), ElectricalProperty.nml (16 KB), Example.txt, Grammar.txt, INML.xml, (5 KB), MeasurementProperty.nml (22 KB), Output.txt, (3 KB), PeriodProperty.nml (6 KB), PhysicalProperty.nml (36 KB), ReservedNameProperty.nml (6 KB), Seg14.nml (30 KB), Seg14Phrasing.nml (71 KB), UsageProperty.nml (7 KB), and Utility.nml (6 KB). These files are incorporated by reference herein.

BACKGROUND

A. Technical Field

The present invention relates to creation of structured data from plain text, and more particularly, to creation of structured data from plain text based on attributes or parameters of a web-site's content or products.

B. Background of the Invention

In recent years, the Internet has grown at an explosive pace. More and more information, goods, and services are being offered over the Internet. This increase in the data available over the Internet has made it increasingly important that users be able to search through vast amounts of material to find information that is relevant to their interests and queries.

The search problem can be described at least two levels: searching across multiple web-sites; and searching within a given site. The first level of search is often addressed by "search engines" such as Google™ or Alta Vista™ or directories such as Yahoo™. The second level, which is specific to the content of a site, is typically handled by combinations of search engines and databases. This approach has not been entirely successful in providing users with efficient access to a site's content.

The problem in searching a website or other information-technology based service is composed of two subproblems: first, indexing or categorizing the corpora (body of material) to be searched (i.e., content synthesis), and second, interpreting a search request and executing it over the corpora (i.e., content retrieval). In general, the corpora to be searched typically consist of unstructured information (text descriptions) of items. For e-commerce web-sites, the corpora may be the catalog of the items available through that web-site. For example, the catalog entry for a description might well be the sentence "aqua cashmere v-neck, available in small, medium, large, and extra large." Such an entry cannot be retrieved by item type or attribute, since the facts that v-neck is a style or sweater, cashmere a form of wool, and aqua a shade of blue, are unknown to current catalogs or search engines. In order to retrieve the information that this item is available, by item type and/or attribute, this description must be converted into an attributed, categorized description. In this example, such an attributed, categorized description may include properly categorizing the item as a sweater, extracting the various attributes, and tagging their values. An example of such a description is illustrated in Table 1.

TABLE 1

| Item | Style | Color | Material | Sizes |
|---|---|---|---|---|
| Sweater | v-neck | Aqua | Cashmere | S, M, L, XL |

Current technology permits such representations in databases. Further, for many standard items, numeric codes are assigned to make the job of search and representation easier. One such code is the UN Standard Products and Services Code (UN/SPSC), which assigns a standard 8-digit code to any human product or service.

However, while the taxonomies and the technology to represent the taxonomies may exist, conventional systems are unable to generate the taxonomic and attributed representation for an object from its textual description. This leads to the first of the two problems outlined above: the content synthesis problem. More specifically, that is the problem of how to convert plain text into structured objects suitable for automated search and other computational services.

The second problem is one of retrieving data successfully; once the data has been created and attributed, it must be accessible. E-commerce and parametric content sites are faced with a unique challenge, since they must offer search solutions that expose only those products, contents or services that exactly match a customer's specifications. Today, more than 50% of visitors use search as their preferred method for finding desired goods and services. However, e-commerce web sites continue to offer their customers unmatched variety, category-based navigation of e-commerce sites ("virtual aisles"), which have become increasingly complex and inadequate. In particular, many web-sites that offer a large catalog of products are often unable to find products with precise or highly parameterized specifications, and instead require the user to review dozens of products that potentially match these specifications.

A few statistics help to emphasize the importance of good searching ability. An important metric that measures the conversion rate of visitors to e-commerce sites into buyers is the book-to-look ratio. The industry average is that only 27 visitors in a 1000 make a purchase. The biggest contributor to this abysmal ratio is failed search. Forrester Research reports that 92% of all e-commerce searches fail. Major sites report that 80% of customers leave the site after a single failed search. Therefore, improving the search capability on a site directly increases revenue through increased customer acquisition, retention, and sales.

While all web-sites experience some form of these search problems to some extent, the T problem is particularly acute for web-sites with a deep and rich variety of content or products. Examples are electronic procurement networks, financial sites, sporting goods stores, grocery sites, clothing sites, electronics, software, and computer sites, among many others. Another class of sites with a deep search problem comprises of those carrying highly configurable products such as travel and automotive sites. Ironically, as a rule of thumb, the more a web-site has to offer, the greater the risk that customers will leave the site because of a failed search.

When a customer physically enters a large department store, she can ask a clerk where she can find what she is looking for. The clerk's "search" is flexible in that he can understand the customer's question almost no matter how it is worded. Moreover, the clerk's "search" is generally accurate since the clerk can often specifically identify a product, or initial set of products, that the customer needs. Searches on web sites need to be equally flexible and accurate. In order for that to happen, a visitor's request must be understood not only in terms of the products, but also in terms of the request's parameters or characteristics. However, conventional information retrieval systems for web-site content have been unable to achieve this.

Some of the conventionally used methods used to find goods and services on web sites, and some problems with these conventional methods are outlined below:

1. Keyword-based search: In this method, users type a set of words or phrases describing what they want to a text box, typically on the main page of the site. A program on the it site then takes each individual word entered (sometimes discarding "noise" words such as prepositions and conjunctions), and searches through all pages and product descriptions to find items containing either any combination of the words. This method, when given an English sentence or phrase, either returns far too many results or too few. For example, if a customer requests, "show me men's blue wool sweaters," the search could be unsuccessful for the following reasons. It would either return only those pages that contain all the words in this request, or return any page that contained any single word in the search. In the former case, no items would be found, though there might be many products with those characteristics for sale. For instance, it is possible that aqua cashmere cardigan would not be matched, since it contains none of the keywords. In the latter case, a large number of items would be found, most of which would be of no interest to the customer. For example, blue wool slack may be incorrectly matched, since it contains the keywords "blue" and "wool." Some keyword-based searches weight results based on how many keywords are matched.

Keyword-based approaches are widely used in medical transcription applications, database access, voice-mail control and web search. Virtually all commercial natural-language interface products use this approach. In this approach, certain words are regarded as meaningful, and the remainder as meaningless "glue" words. Thus, for example, in the sentence "show all books written by Squigglesby" the words "show," "book," and "written" may be regarded as keywords, the word "by" as a meaningless glue word, and the word "Squigglesby" as an argument. The query would then be formed on the theory that a book author named Squigglesby was being requested.

In such systems, keywords are generally some of the common nouns, verbs, adverbs and adjectives, and arguments are proper nouns and numbers. There are exceptions, however. Prepositions are usually regarded as glue words, but in some circumstances and in some systems are regarded as keywords. Generally, this is due to the human tendency to omit words in sentences, known in the argot as "ellipses." The sentence "Show all books by Squigglesby" is an example of this, where the verb "written" is excluded. In order to cope with this, some keyword-based systems make "by" a keyword.

There are a few specialized cases of, or variations on, keyword searches. Database approaches are an example of a widely used variant on keyword-based approaches. In these systems, the database developer associates keywords or identifiers with specific database fields (columns in specific tables). Various words, specifically interrogative pronouns and adjectives, some verbs, and some prepositions, have fixed meanings to the database query program. All other words can be available as keywords for a template-based recognition system. In response to a user's sentence, the interface system may match the user's sentence to a template set constructed from the database developer's information about database structure and identifiers, and its built-in interpretation of its hardwired keywords. A Structured Query Language (SQL) statement would then be generated which encodes the meaning of the user's sentence, as interpreted by the interface system.

Another example of a specialization of the keyword-based approach is a catalog-based approach. Catalogs are databases of products and services. A "category" is the name of a table: the attributes of the category are some columns of the table. In this approach, a question is first searched by a category word, and then the remainder of the question is used as keywords to search for matching items within the category. For example, "blue woolen sweater" would first search for "blue" "woolen" and "sweater" as keywords indicating a category, and then (assuming "sweater" succeeded as a category keyword and the others did not), for "blue" and "woolen" as keywords within the sweater category. The difficulty with this approach is that cross-category queries fail, since no individual category is available to match in such cases. Further, parameters that are not present in the product descriptions in the category are not used.

Some of the central limitations of keyword-based systems are described below:

Meanings of words are fixed, independent of context. In keyword-based systems, keywords have fixed semantics. This is a distinct departure from the use of normal language by humans. Words in natural language derive their meaning through a combination of "symbol" (the word itself) and "context" (the surrounding text and background knowledge). The most glaring example is prepositions in the presence of ellipses. For instance, "by" can indicate the subject of almost any transitive verb, as well as physical proximity or indicating an object or method to use to accomplish a particular task. Another example of meaning dependent on context is that "green" can refer to a color, a state of freshness or newness, or, disparagingly, to inexperience. A quick glance at any page of any dictionary will show that most words have multiple, and often unrelated, meanings, and context is what disambiguates them. Contrary to this nuanced usage of words, in general, keyword-based approaches choose one single meaning for each word, and apply that meaning consistently in all searches. This problem is fundamentally unfixable in these systems: in order to attach a contextual semantic to a word, strong parsing technology is required and a means must be found of specifying a word in context, sufficient for a program to understand the contextual meaning.

Strongly tied to an application. Since the meanings of words must be fixed so strongly, these systems have the interface strongly tied to (and, in general, inseparable from) the application. There is no toolkit comparable to the popular Graphical User Interface ("GUI") toolkits to form a keyword-based natural-language interface to an arbitrary application.

Missed meanings attached to glue words, especially prepositions. An assumption behind keyword-based approaches is that glue words carry no meaning or semantic content. Unfortunately, in practice there are very few words whose meanings are always unimportant. The words chosen as glue words are those whose meaning is most context-dependent, and thus their semantic content is largely missed.

High error rates, non-robust. Since meanings are attached to words independent of context, meanings can often be guessed wrong. For example, one vendor in this space, Linguistic Technology Corporation, distributes a product ("EnglishWizard") that permits database users to ask questions of a database. A demonstration is given with a database of purchasers, employees, sales, and products. In this example database, numbers always refer to the number of employees. This produces a sequence where, when a user asks "who purchased exactly two items," the answer is "no one." However, when a user asks how many items a particular individual purchased, the answer is "two." The reason for the discrepancy could be that EnglishWizard did not really understand the question. Instead, the first user question was mapped to a question about employees since it included a number in it.

2. FREE-FORM KEYWORD SEARCH: This category replaces keywords with previously-asked questions and the "right" answers, and returns the answers to the typed-in question. Examples of such systems are described in detail in U.S. Pat. No. 5,309,359, entitled "Method and Apparatus for Generating and Utilizing Annotations to Facilitate Computer Text Retrieval," issued on May 3, 1994 to Katz, et al., and U.S. Pat. No. 5,404,295, entitled "Method and Apparatus for Utilizing Annotations to Facilitate Computer Retrieval of Database Material," issued on Apr. 4, 1995 to Katz, et al. In systems employing free-form keyword searching, questions and answers are stored as sets. The question is typically stored in a canonical form, and a rewrite engine attempts to rewrite the user question into this form. If the user question maps into a pre-determined question for which the answer is known, then the answer is returned by the system. Such an approach is used by http://www.AskJeeves.com for Web searching applications, and for lookups of frequently-asked questions (FAQs).

Such systems have several limitations, including the following:

A relatively small number of questions can be answered: The number of questions that can be answered is linearly proportional to the number of questions stored—thus, this method can only be used when it is acceptable to have a relatively small number of questions that can be answered by the system.

Cannot directly answer a user's question: Since such a system processes a user question in toto, and does not attempt to parse it or extract information from the parts, it cannot be used where the solution to the user question requires the use of a parameter value that can be extracted from the question. In sum, the system can merely point the user at a page where his question can be answered—it cannot directly answer the user question.

3. UNDERSTANDING-BASED SEARCHES: Systems incorporating understanding-based searches attempt to understand the actual meaning of a user's request, including social and background information. An example of such a system is Wilensky's UNIX-based Help system, UC. UC had built into it a simple understanding of a user's global goals. Wilensky explained that a consequence of not having such a deep understanding was that the system might offer advice, which literally addressed the user's immediate question in a way that conflicted with the user's global goals. A specific example is that a request for more disk space might result in the removal of all the user's files—an action that met the immediate request, but probably not in a way that the user would find appropriate.

Understanding based systems are generally confined to conversational partners, help systems, and simple translation programs. In general, it should be noted that the underlying application is quite trivial; in fact, the interface is the application. Various specialized systems have also been built, to parse specific classes of documents. A good example is Junglee's resume-parser. Researchers in this area have now largely abandoned this approach. Indeed, the academic consensus is that full understanding is "AI-complete": a problem that requires a human's full contextual and social understanding.

There have been multiple previous attempts to use natural language as a tool for controlling search and computer programs. One example of these is Terry Winograd's "Planner" system, which was described in his 1972 doctoral thesis. Winograd developed an abstract domain for his program, called the "Blocks World." The domain consisted of a set of abstract three-dimensional solids, called "blocks," and a set of "places" on which the blocks could rest. Various blocks could also rest on top of other blocks. Planner would accept a variety of natural language commands corresponding to the desired states of the system (e.g., "Put the pyramid on top of the small cube"), and would then execute the appropriate actions to achieve the desired state of the system. Winograd's system accepted only a highly stylized form of English, and its natural-language abilities were entirely restricted to the blocks' domain. The emphasis in the system was on deducing the appropriate sequence of actions to achieve the desired goal, not on the understanding and parsing of unrestricted English.

A variety of programs emerged in the 1980's to permit English-language queries over databases. EasyAsk offers a representative program. In this system, the organization or schema of the database is used as a framework for the questions to be asked. The tables of the database are regarded as the objects of the application, the columns their attributes, and the vocabulary for each attribute the words within the column. Words that do not appear within the columns, including particularly prepositions, are regarded as "noise" words and discarded in query processing.

Such understanding-based systems have a variety of problems, including the following:

Ignored vital relationships: Database schemas are designed for rapid processing of database queries, not semantic information regarding the databases. Relationships between database tables are indicated by importing indicators from one table into another (called "foreign keys"). Using the relationships in the schema as a framework for questions ignores some vital relationships (since the relationship is not explicitly indicated by key importation).

Lost semantic information: Prepositions and other "noise" words often carry significant semantic information, which is context-dependent. For example, in a database for books, authors, and publishers, the preposition "by" may indicate either a publisher or an author, and may indicate the act of publishing or authoring a book.

In addition to the problems described above with respect to some of the different approaches that currently exist for retrieving data, all of the above approaches share the limitation that the Natural Language ("NL") interface for each application must be handcrafted; there is no separation between the NL parser and interface, and the application itself. Further, development of the interface often consumes more effort than that devoted to the application itself. None of the currently existing approaches to NL interfaces is portable across applications and platforms. There is no NL toolkit analogous to the Windows API/Java AWT for GUIs, nor a concrete method for mapping constructs in NL to constructs in software programs.

Thus, there exists a need for a system and method for creating structured parametric data from plain text, both for purposes of content synthesis and for purposes of data retrieval. Further, such a system should be portable across applications and platforms. In addition, such a system should be able to support searches on any relevant criteria which may be of interest to a web-site's visitors, and by any arbitrary range of values on any parameter. Further, there exists a need for a system which updates seamlessly, invisibly, and rapidly to accommodate a change, when a web-site adds or modifies the products it offers.

SUMMARY OF THE INVENTION

The present invention provides a system, method, and an architecture for receiving unstructured text, and converting it to structured data. In one embodiment, this is done by mapping the grammatical parse of a sentence into an instance tree of application domain objects. In addition, the present invention is portable across different application domains.

A system in accordance with the present invention can be used for creating structured data from plain text, to allow for the efficient storing this structured data in a database. For example, from the free text description of a number of products, the structured data (which could be an extracted object and its attributes) can be used to create individual entries in a product database, and thus create content for an ecommerce website or web market. Alternately, or in addition, such a system can be used for creating structured data from from a plain text query, for using this structured data to retrieve relevant data from a database. For example, a user's free text query can be converted to a database query that corresponds to the objects of the database and their attributes. Such a system overcomes the limitations of conventional search engines by accepting free form text, and mapping it accurately into a structured search query.

The present invention recognizes that understanding natural language is neither required nor desired in generating structured data; rather, what is desired is the ability to map natural language onto program structure. Further, there is a natural relationship between the parse of the sentence as expressed in a parse tree and a component tree in a program. Thus, the natural language sentence is understood as instructions to build a component tree. A content engine takes in a natural language sentence and produces a program component tree. The component tree is then further simplified before it is passed to a program for execution.

As mentioned above, a system in accordance with the present invention can be used across various applications. In the various embodiments of the present invention, the meaning of a word is dependent only on the application and the role of the word in the sentence. Thus, the definition of a word is largely the province of the application developer. Briefly, words act as identifiers for components. A word in a sentence serves as an identifier for program objects. As discussed above, many words in English or other natural languages have multiple meanings with the meanings dependent upon context. Similarly, for the present invention, a word may be used as an identifier for multiple objects.

In one embodiment, the present invention transforms an English sentence into a set of software objects that are subsequently passed to the given application for execution. One of the advantages of this approach is the ability to attach a natural language interface to any software application with minimal developer effort. The objects of the application domain are captured, in one embodiment, by using the Natural Markup Language ("NML"). The resulting interface is robust and intuitive, as the user now interacts with an application by entering normal English sentences, which are then executed by the program. In addition, an application enhanced with the present invention significantly augments the functionality available to a user.

When given a plain text sentence in a natural language, a system in accordance with one embodiment of the present invention performs the following steps:

(i) A parsing algorithm applies a formal context-free grammar for the natural language to derive all parses of a given sentence. For purposes of discussion, English is used as an example of the natural language of the plain text. However, it is to be noted that the present invention may be used for any natural language. In one embodiment, all parses of the sentence are derived in the time taken to derive a single parse (e.g., concurrently). Preferably all parses are stored in a single data structure whose size is dramatically smaller than the number of individual parse trees, often just a constant factor larger than the size taken to store a single parse tree. It is to be noted that, in one embodiment, the correct map of a sentence is only known after all possible parses have been attempted.

(ii) A mapping algorithm then uses the structure of each parse tree for a given sentence to attempt to derive an object representation of the sentence within the domain of interest based on the application-specific NML model. In other words, the mapping algorithm maps each parse outputted by the parser, into an instance tree of objects. In one embodiment, this is done by generating instance trees, mapping each parse onto an instance tree, pruning the instance trees generated, and then using a best-match algorithm on the pruned trees to select the best match.

(iii) A reduced form of the NML object description instance is created as an instance of a Domain Markup Language ("DML"). This DML is passed to the application program for execution.

The features and advantages described in this summary and the following detailed description are not all-inclusive, and particularly, many additional features and advantages will be apparent to one of ordinary skill in the art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The figures depict a preferred embodiment of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

I. System Architecture

Figure 1:
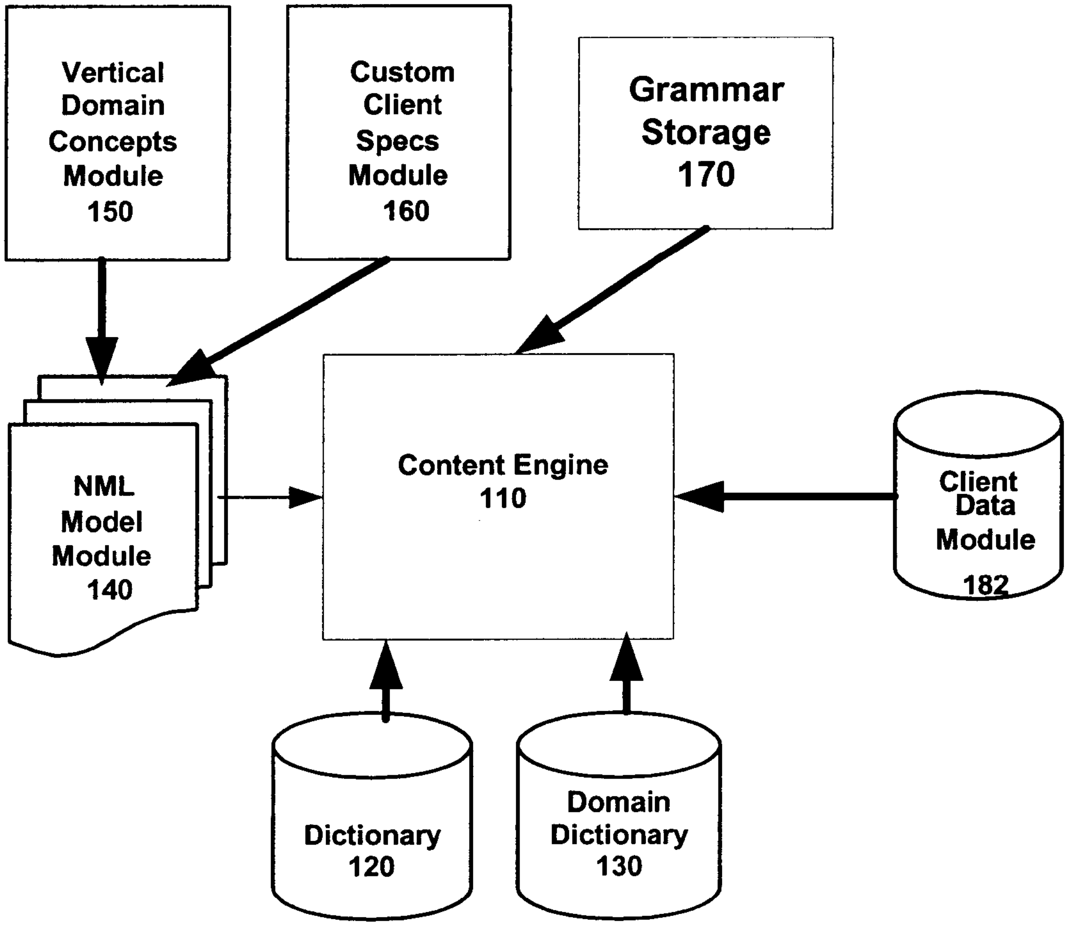
FIG. 1 is an illustration of the architecture of a system in accordance with an embodiment of the present invention.

FIG. 1 illustrates an overview of the architecture of a system in accordance with one embodiment of the present invention. The system comprises a content engine 110, an online dictionary 120, a domain dictionary 130, a Natural Markup Language ("NML") module 140, a vertical domain concepts module 150, a custom client specifications module 160, a grammar storage 170, and a client data module 182.

The content engine 110 receives as input plain text, parses it, and maps the parses into instance trees. As can be seen from FIG. 1, in one embodiment of the present invention, the content engine 110 receives input from both the online dictionary 120 (which includes words in a natural language), and a domain dictionary 130 (which includes terms specific to a domain).

In addition, the content engine 110 receives input from the NML module 140, which contains an NML model specific to the application or domain for which the system is being used. The application-specific NML is created, in one embodiment, using a combination of automatic and manual editing from the vertical domain concepts obtained from the vertical domain concepts module 150, and the custom client specifications obtained from the custom client specifications module 160. The present invention is customized to a vertical domain 150 of application by creating an object oriented data model that represents the intended functionality of the site. An example of the vertical domain concepts 150 is taxonomy such as the United Nations Standard Product & Services Code (UN/SPSC). Another example of the vertical domain concepts 150 is the set of concepts that are pertinent to financial information for a company such as, company name, location, officers, products, competitors, annual sales, revenues, employees, etc. An example of custom client specifications 160 is a collection of concepts similar to the vertical domain concepts 150, but specific to a web-site (i.e. not found on all web-sites that may be in the same domain).

In addition, an input to the content engine 110 is also provided by the grammar storage 170. The grammar storage 170 stores a grammar for a particular language. In one embodiment, the grammar storage 170 stores a full context-free grammar for the English language. An example of such a grammar is included in the computer program listing appendix in file grammer.txt. The grammar shown in grammar.txt has its start symbol as<Paragraph>. The rules indicate that a <Paragraph> is composed of one or more <Sentence> symbols separated by <Terminator>. Similarly, a <Sentence> is composed of a <Clause> and so on. Grammars are discussed in greater detail below.

The content engine 110 also has access to a module containing client data 182. This data is used for client-specific or dynamic vocabulary that does not transfer across client sites or applications. Examples of such vocabulary include trade or brand names (e.g. "Explorer", "Expedition", or "Excursion" for Ford sport utility vehicles, or the names of confections made by Hershey Foods Company).

Figure 2:
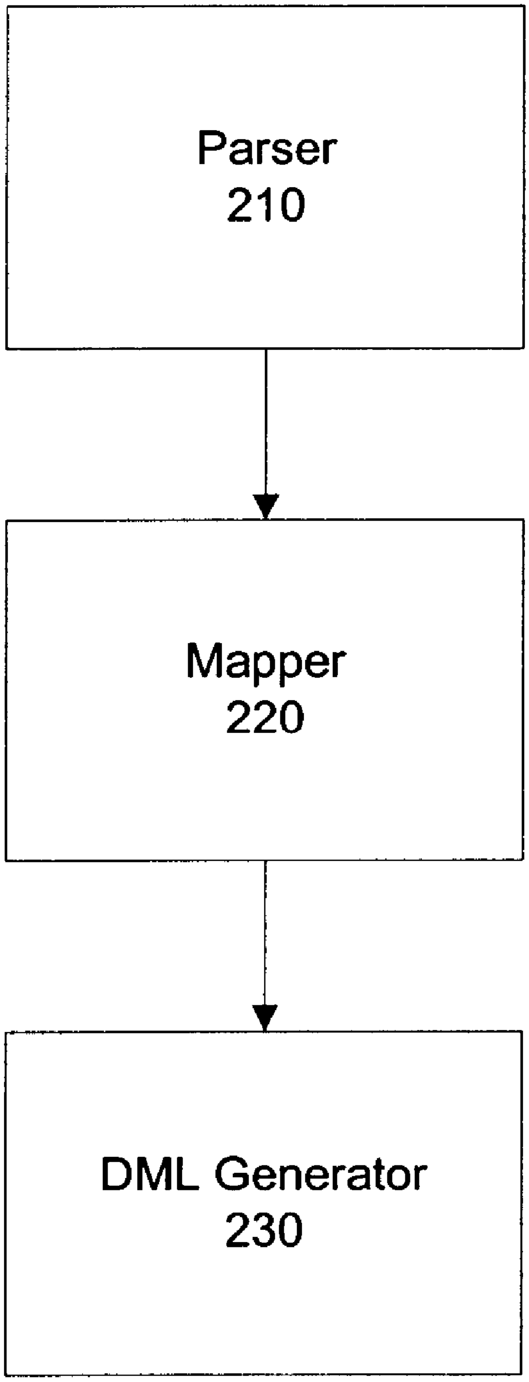
FIG. 2 is a block diagram of the components of the content engine.

FIG. 2 illustrates the architecture of the content engine 110 in an embodiment of the present invention. As can be seen from FIG. 2, the content engine 110 comprises a parser 210, a mapper 220, and a Domain Markup Language ("DML") generator 230.

The parser 210 parses the text input by the user into all possible parses, based on the grammar stored in the grammar storage 170. In one embodiment, the parser 210 applies a formal context-free grammar for the language in which the user is working, to derive all parses of a given sentence. In one embodiment, all parses are derived in the time taken to derive a single parse. In a preferred embodiment, all of the parses are stored in a single data structure of size equivalent to that taken to store a single parse tree. The parser 210 may generate meaningless parses, but this is acceptable because, as will be discussed below, these meaningless parses will not yield valid mappings into the NML and will be automatically discarded from consideration during the mapping process. The functionality of the parser 210 is discussed in greater detail below.

The mapper 220 accesses all the parses of the text input by the user produced by the parser 210. The mapper 220, in turn, uses the structure of each parse tree for a given sentence to attempt to derive an object representation of the sentence within the domain of interest based on the application-specific NML model provided by the NML module 140. In other words, the mapper 220 maps each parse outputted by the parser 210, into an instance tree of objects. The functionality of the mapper 220 is discussed in detail below.

In one embodiment, the result of the mapper 220 is not the final result of the content engine 110. One more step remains: the DML generator 230 reduces the structure produced by the mapper 220 to a simpler form. The generation of the DML is directed, in one embodiment, by DML_ELEMENT declarations contained in the NML model provided by the NML module 140. The result of this process, decribed in detail below, is to produce a document in the Domain Markup Language ("DML"). The DML description can then be passed as an input to the underlying application (not shown in the figures). In one embodiment, the application takes the DML input and use it to populate a database, using each instance tree as the description of an entity (and its attributes) in the application domain, and creating the appropriate entries in the database. In another embodiment, the application takes the DML input and uses it as a query on an underlying database, to retrieve entries (e.g., products) that satisfy the query, and hence match the user's interests (to the extent that such interest is well expressed in the original text input).

II. System Functionality

A. Background Information

Before discussing the functionality of an embodiment of a system in accordance with the present invention, it will be helpful to discuss what a grammar is, what NML is, and what DML is.

1. Grammar

Languages, both natural and computer, are described by means of a "grammar." A grammar is a series of mathematical objects called "productions," which describe mathematically the well-formed "sentences" of the grammar.

A simple example of a grammar, "Grammar1" is as follows:

S⇒AB

A⇒aA

A⇒a

B⇒bB

B⇒b

The symbols "S", "A", and "B" are called "non-terminals" or "phrases." They represent purely abstract objects, which do not appear in any sentence in the language, but represent a group of symbols of a language sentence. The symbols "a" and "b" represent words in the language, and are called "terminals" or "words." By convention, every grammar has a phrase "S" for "sentence", which appears alone on the left-hand side of one production. A production is applied by replacing the left-hand side of the production with the right-hand side in a string.

A sequence $\alpha$ of terminals is said to be derived from a sequence $\gamma$ of non-terminals and terminals if $\alpha$ can be transformed into $\gamma$ by applying a succession of productions of the grammar. For example, for Grammar1, "aabb" can be derived from "aAbB" because the rules A⇒a and B⇒b, applied to aAbB yield aabb. A sequence of terminals, or a "sentence," is said to be in the language of the grammar if it can be derived from the start symbol, S. For example, for Grammar1, the sequence "abb" is in the language of the grammar, because S⇒AB⇒aB⇒abB⇒abb. Conversely, "abab" is not in the language, since no succession of productions can be used to derive "abab" from S.

In English and other natural languages, the non-terminals and terminals correspond intuitively to the standard grammatical objects learned by a school child. The terminals are simply the words and punctuation symbols of the language; the non-terminals are the standard phrase constructs and word types learned in elementary school: noun, verb, noun phrase, verb phrase, etc. The set of non-terminals in human languages tend to be fairly limited; the set of terminals and the productions vary widely, and in their variance is the rich diversity of human language. In general, any sequence of non-terminals and terminals may appear on either side of a grammar rule. However, grammars which exploit this freedom are computationally intractable. Thus various restrictions are often placed on the form of the left-hand side and the productions which make parsing these restricted grammars computationally tractable.

Of particular interest are "context-free grammars," which are distinguished in that the left-hand side of each production is restricted to be a single non-terminal. Grammar1 given above is context-free. In fact, it is of a slightly more restricted type: "regular".

As will be explained in more detail below, the context-free grammar used in one embodiment by the content engine 110 provides the minimal amount of grammatical information necessary to capture the correct parse of any grammatically correct English sentence. The main intent of the grammar is to capture the correct parse of a sentence without attempting to understand the meaning (or semantics) of the sentence. The grammar is thus created to include every correct parse of every sentence in the language. Naturally, for any single sentence this results in several ambiguous parses, only one of which is the (semantically) correct parse of the given sentence.

One skilled in the art will note that the grammar provided by the grammar storage 170, in one embodiment, can be substantially compacted from a full grammar of the English language, so as to facilitate brevity of the grammar. For example, the grammar shown in grammar.txt comprehensively ignores grammatical features like verb conjugations, plurality of nouns, tense, active or passive voice etc. This is acceptable because these features are irrelevant to the parse of a sentence and are only needed if the semantics of a sentence were to be analyzed in detail.

In grammatical analysis, the particular sequence of rewrite rules used to derive the sentence is usually called the parse of the sentence. In a context-free grammar, the parse of a particular sentence can be represented mathematically as a "parse tree."

Figure 3A:
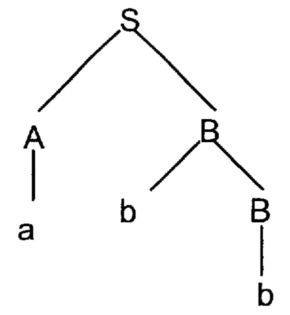
FIG. 3A is an example of a parse tree for "abb" using a first grammar.

FIG. 3A depicts an example of a parse tree for "abb", using the Grammar1 above. For an arbitrary grammar, a parse may not be unique. For example, consider now the Grammar2.

S⇒AB

S⇒CB

A⇒aB

A⇒aA

A⇒a

B⇒bB

B⇒b

Figure 3B:
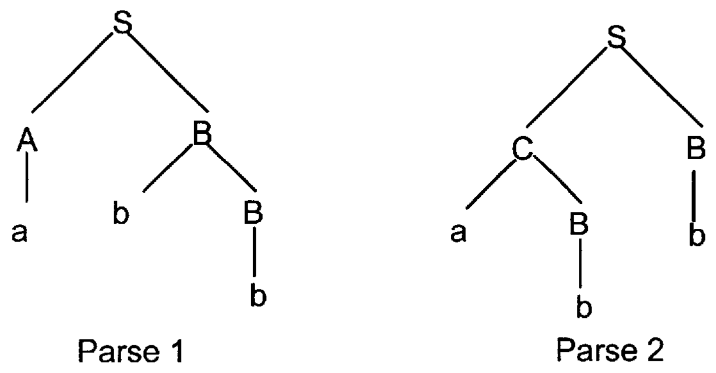
FIG. 3B is an example of two different parse trees for "abb" using a second grammar.

Based on Grammar2, the string "abb" would have two distinct parses as depicted by the two separate parse trees shown in FIG. 3B.

Such a grammar, which can result in multiple parse trees for a string, is said to be "ambiguous." Most grammars for human languages are ambiguous in this precise technical sense, for the excellent reason that human language is itself ambiguous. For instance, in the sentence "The boy helped the girl with the suitcase," the modifier "with the suitcase" can either apply to the girl, or to the act of helping. In general, a modifier can modify any part of the sentence. Resolution of ambiguities is an important problem in parsing, and will be discussed below.

Figure 3C:
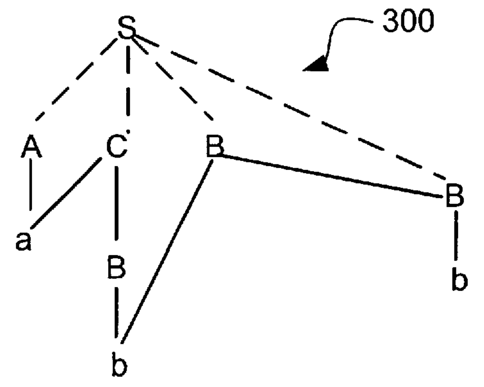
FIG. 3C illustrates how various parse trees can be represented as a single parse DAG.

Referring again to FIG. 3B, it can be noted that conventionally, different parses result in different parse trees. However, in accordance with an embodiment of the present invention, all parses of a given sentence can be represented as a single parse Directed Acyclic Graph ("DAG") 300. This is illustrated in FIG. 3C for sentence "abb".

The dashed edges 310 of DAG 300 represent optional parses; selection of a set encompasses a valid parse tree. By examining FIGS. 3B and 3C, it can be seen that the two trees in FIG. 3B have a total of 14 nodes and 12 edges; in contrast, the parse DAG shown in FIG. 3C has a total of only nine nodes and 11 edges. The space and time savings represented by using the parse DAG are dramatic when there are hundreds or thousands of parses, as is typical for English sentences. The space and time taken to construct the parse DAG is proportional to the number of distinct nodes in the component parse trees, whereas the space and time taken by conventional algorithms is proportional to the number of nodes of the parse trees.

2. Natural Markup Language ("NML")

The approach of the present invention is based on describing the set of concepts of a specific application area or domain as a set of objects. Objects are grouped into two fundamental classes:

(i) Enumerations: These are objects defined by single words or fixed phrases in English over the given domain. A simple example of an Enumeration is the object Color, which is defined by the color words (e.g., red, blue, mauve) of everyday experience.

(ii) Composites: These are objects are defined as collections of sub-objects. The sub-objects of a composite are called its "attributes." One example of a composite is the object Desk, which can have attributes PrimitiveDeskWord (e.g., the enumerated object consisting of the word desk and its synonyms), PedestalType (e.g., a composite describing whether this desk has a right, left, or double pedestal), Dimension (e.g., a composite giving the height, width, and depth of the desk), Use (e.g., an enumeration consisting of executive, computer, student, secretary), and various other attributes describing the material, finish, and optional features of the desk.

NML is a language for declaring objects, enumerations, and the relations between objects. In one embodiment, the NML programmer declares the composites and enumerations of the domain. In one embodiment, NML is based on the Extensible Markup Language ("XML") standard. It should be noted that the NML description of a domain describes a graph of objects, where the sinks of the graph (the nodes with no outgoing edges) are the Enumerations of the domain.

As discussed above with reference to FIG. 1, the NML module 140 provides an application-specific NML to the content engine 110. NML is a tool for describing an application's object hierarchy and the vocabulary by which the hierarchy is referenced in natural language to the content engine 110. Because the meanings of words themselves are not relevant to the actual implementation of a system, the present invention can be used for various different applications. An NML document may be created for each application, and, typically, a small special-purpose markup language for the domain itself may be created. The markup language and the NML document are strongly related. An NML document captures the concepts of an application domain, and the markup language is designed to hold the values for those concepts for a particular query.

An example of such a markup language document (from the "CompanyProfileAPI" Markup Language) is shown below, corresponding to the values for the query "Who is the director of human resources for Microsoft in the United Kingdom?"

```
<COMPANY_PROFILE_API>
    <API_COMPANY_PERSON>
        <PERSON_FULL_NAME GET_OPERATOR="value"/>
        <COMPANY_NAME SET_VALUE="microsoft"/>
        <LOCATION>
            <COUNTRY SET_VALUE="uk"/>
        </LOCATION>
        <PERSON_TITLE SET_VALUE="boss"/>
        <DIVISION SET_VALUE="human resource"/>
    </API_COMPANY_PERSON>
</COMPANY_PROFILE_API>
```

In this example, it will be seen that the morphology and, in some cases, the actual words of the query have been eliminated; rather, the concepts and values have been inserted in the document, and whether the user query requested or set the specific value. In this case, the person's full name was requested, and the identifying information given was the company he worked for, the country he worked in, his conceptual title ("boss") and his division ("human resources"). This is sufficient information to run a query to satisfy the user's request, but all knowledge of the actual English he used in stating his query (and all requirements to parse it) have been eliminated.

As mentioned above, in one embodiment of the present invention, NML is an extension of the eXtensible Markup Language (XML). Briefly, XML is the core of all tag-based markup languages. It is almost never used standalone, but is configured into an application-specific tag-based markup language. Examples of such languages are the Mathematical Markup Language, MML, and Commerce One's product interchange language.

An XML document consists of a set of "elements." An element is a chunk of a document contained between an HTML-style tag and its matching closing tag. Unlike HTML, however, XML has no built-in tags—rather, the set of tags for a specific document are defined by its Document Type Definition, or DTD. The distinction between two separate XML extension languages are, simply, their DTDs.

Let us introduce NML with a "Hello, world" program. Unlike most programming languages, however, NML isn't good for printing "hello, world"; rather, it's good for recognizing "hello, world". The program which recognizes "hello, world" appears below in Program1.

```
<?xml version="1.0"? >
<!DOCTYPE NML_MODEL
>
    <NML_MODEL DOMAIN="HelloWorld1">
        <COMMENT>
        This file shows the simplest Hello, World example
        </COMMENT>
        <ENUMERATION NAME="HelloWorld">
            <IDENTIFIER LITERAL="Hello, World"/>
        </OBJECT>
    </NML_MODEL>
```

Program1 above is extremely simple; it just recognizes an object indexed by the string "hello, world", and maps it to the object "HelloWorld." The IDENTIFIER element within the ENUMERATION element indicates that the LITERAL argument, when it occurs in the text, creates an instance of the relevant ENUMERATION. Thus, the phrase "hello, world" creates an instance of the HelloWorld object, and this maps that exact phrase. This program, while simple, recognizes only the exact phrase "hello, world" with various capitalizations. A simple program which recognized only this exact phrase would have served as well, and been far simpler to write. However, in NML, a program which recognizes much more is almost as easy to write. This is shown in the next example in Program2.

```
<?xml version=“1.0”?>
<!DOCTYPE NML_MODEL >
    <NML_MODEL DOMAIN=“HelloWorld2” >
        <COMMENT>
        This file shows a non-working Hello, World example
        </COMMENT>
        <OBJECT NAME=“HelloWorld”>
            <ATTRIBUTE MIN=“1” MAX=“1” INFER=“false” ID=“Greeting”/>
            <ATTRIBUTE MIN=“1” MAX=“1” INFER=“false” ID=“World”/>
        </OBJECT>
        <ENUMERATION NAME=“Greeting”>
            <IDENTIFIER LITERAL=“hello”/>
            <IDENTIFIER LITERAL=“hi”/>
            <IDENTIFIER LITERAL=“greeting”/>
            <IDENTIFIER LITERAL=“good morning”/>
            <IDENTIFIER LITERAL=“good afternoon”/>
        </ENUMERATION>
        <ENUMERATION NAME=“World”>
            <IDENTIFIER LITERAL=“world”/>
            <IDENTIFIER LITERAL=“everyone”/>
            <IDENTIFIER LITERAL=“everybody”/>
        </ENUMERATION>
    </NML_MODEL>
```

Program2 above declares an object HelloWorld with two sub-objects, or ATTRIBUTES: Greeting and World. Greeting is indexed by the literals “hello”, “hi”, “good morning”, and “good afternoon”; World by “everyone”, “everybody”, and “world”. The MIN=1 argument to both ATTRIBUTES indicates that any object of type HelloWorld must have both a Greeting and World ATTRIBUTE. The sentence “Hello”, for example, will not match, because the World ATTRIBUTE would be missing. Similarly, MAX=1 indicates that only one ATTRIBUTE of each type can be present: “Hello everyone good afternoon” would be unmapped, since two Greeting objects would be created to be sub-objects of HelloWorld.

Program2 when implemented by the content engine 110, is designed to recognize the following phrases.

| | | | |
|---|---|---|---|
| Hello, world | Hi, world | Good morning, world | Good afternoon, world |
| Hello, everyone | Hi, everyone | Good morning, everyone | Good afternoon, everyone |
| Hello, everybody | Hi, everybody | Good morning, everybody | Good afternoon, everybody |

However, Program2 does not quite work to recognize these phrases. In fact, Program2 recognizes nothing. Rather, the Program3 below, which differs from the Program2 by a single word, does in fact recognize the above phrases.

```
<NML_MODEL DOMAIN=“HelloWorld2” >
    <COMMENT>
    This file shows a working Hello, World example
    </COMMENT>
    <OBJECT NAME=“HelloWorld”>
```

-continued

```
        <ATTRIBUTE MIN=“1” MAX=“1” INFER=“false”
```

-continued

```
        ID=“Greeting”/>
        <ATTRIBUTE MIN=“1” MAX=“1” INFER=“true”
        ID=“World”/>
    </OBJECT>
    <ENUMERATION NAME=“Greeting”>
        <IDENTIFIER LITERAL=“hello”/>
        <IDENTIFIER LITERAL=“hi”/>
        <IDENTIFIER LITERAL=“greeting”/>
        <IDENTIFIER LITERAL=“good morning”/>
        <IDENTIFIER LITERAL=“good afternoon”/>
    </ENUMERATION>
    <ENUMERATION NAME=“World”>
        <IDENTIFIER LITERAL=“world”/>
        <IDENTIFIER LITERAL=“everyone”/>
        <IDENTIFIER LITERAL=“everybody”/>
    </ENUMERATION>
</NML_MODEL>
```

As can be seen from examining Program2 and Program3, the change is in the World ATTRIBUTE of the HelloWorld OBJECT: in Program3, the INFER argument is set to true. Inference is when the presence of a modifier can imply the existence of an object, even when the object is not explicitly identified. Here this means that whenever a World OBJECT is created, a HelloWorld OBJECT will be created containing it. This is the second of the two methods by which OBJECTs are created: the first, which has already been described, is when an IDENTIFIER is encountered. In Program3, Greeting and World objects were created, but no HelloWorld object; in fact, in that program, no HelloWorld object could be created, since it had no IDENTIFIERS, nor was it INFERred from any ATTRIBUTE.

The difference in behavior between Program2 and Program3 is due to one other factor: in Program3, all nouns and verbs in a sentence must be matched in a tree rooted in a single object, or the sentence as a whole is not considered mapped.

As mentioned above, NML is the means by which the application developer describes the structure of his application to the content engine 110. In many ways, it is equivalent to defining an Application Program Interface (API) for the application, with a key property, in one embodiment, that the "application programmer" in this case is a user speaking a specific language (e.g., English). Thus, the API is very simple: it encapsulates only those objects and attributes which a user can create with a single English sentence and which would be expected to be known by users of the application. For example, in a furniture catalog, the NML would describe objects such as Desk, which can have attributes such as PrimitiveDeskWord (e.g., the enumerated object consisting of the word desk and its synonyms), and PedestalType (e.g., a composite describing whether this desk has a right, left, or double pedestal).

In one embodiment, an NML file thus looks similar to a Java interface file or a C++.h file: it is a description of the objects of an application, without their implementation. The object hierarchy described in the NML file is in logical structure and function very much the programmer's object hierarchy for the application: a few additional objects are typically added to provide targets for English mapping. This section concerns itself with the raw structure of NML: the means by which this is deployed in an application will be seen below.

The easiest way to look at NML is to start with its document type definition (DTD) given below.

```
<!DOCTYPE NML_MODEL [
    <!ELEMENT NML_MODEL
(COMMENT?, IMPORT*, (OBJECT|ENUMERATION|CALLBACK|PATTERN |
COMMENT|DML_CALL)*)>
    <!ATTLIST NML_MODEL
        DOMAIN CDATA #REQUIRED
        GENERATE_PEER (true | false | TRUE | FALSE | True | False) "true">
    <!ELEMENT IMPORT EMPTY>
    <!ATTLIST IMPORT
        FILE CDATA #REQUIRED>
    <!ELEMENT OBJECT (COMMENT?, ATTRIBUTE*)>
    <!ATTLIST OBJECT
        NAME CDATA #REQUIRED
        EXPR (true | false | TRUE | FALSE | True | False) "true"
        SINGLETON (true | false | TRUE | FALSE | True | False) "false"
        ROOT (true | false | TRUE | FALSE | True | False) "false"
        DML_ELEMENT CDATA #IMPLIED
        DML_ATTRIBUTE CDATA #IMPLIED
        DML_VALUE CDATA #IMPLIED
        PEER (true | false | TRUE | FALSE | True | False) "true">
    <!ELEMENT ENUMERATION (COMMENT?, IDENTIFIER*)>
    <!ATTLIST ENUMERATION
        NAME CDATA #REQUIRED
        EXPR (true | false | TRUE | FALSE | True | False) "true"
        ROOT (true | false | TRUE | FALSE | True | False) "false"
        DML_ELEMENT CDATA #IMPLIED
        DML_ATTRIBUTE CDATA #IMPLIED
        DML_VALUE CDATA #IMPLIED
        PEER (true | false | TRUE | FALSE | True | False) "true">
    <!ELEMENT COMMENT ANY>
    <!ELEMENT IDENTIFIER EMPTY>
    <!ATTLIST IDENTIFIER
        MAP CDATA #IMPLIED
        LITERAL CDATA #REQUIRED
        UNKNOWN (true | false | TRUE | FALSE | True | False) "false"
        TYPE (Interrogative | Adjective | Verb | Noun | Adverb | Pronoun |
Preposition | Literal) REQUIRED>
    <!-- An ATTRIBUTE can be an OBJECT, ENUMERATION, OR CALLBACK -->
    <!ELEMENT ATTRIBUTE EMPTY>
    <!ATTLIST ATTRIBUTE
        INFER (true | false | TRUE | FALSE | True | False) "false"
        MIN (0 | 1 | 2) "0"
        MAX (1 | 2 | many) "many"
        ID CDATA #REQUIRED
        DML_ELEMENT CDATA #IMPLIED
        DML_ATTRIBUTE CDATA         #IMPLIED
        DML_VALUE CDATA #IMPLIED
        PEER (true | false | TRUE | FALSE | True | False) "true">
    <!ELEMENT CALLBACK EMPTY>
    <!ATTLTST CALLBACK
        NAME CDATA #REQUIRED
        EXPR (true | false | TRUE | FALSE | True | False) "true"
        ROOT (true | false | TRUE | FALSE | True | False) "false"
        CLASS CDATA #REQUIRED
        TOKENIZER CDATA #REQUIRED
        MAPPER CDATA #REQUIRED
        DML_ELEMENT CDATA #IMPLIED
        DML_ATTRIBUTE CDATA #IMPLIED
        DML_VALUE CDATA #IMPLIED
        PEER (true | false | TRUE | FALSE | True | False) "true">
```

-continued

```
<!ELEMENT PATTERN (REGEXP+)>
<!ATTLIST PATTERN
     NAME CDATA #REQUIRED
     EXPR (true | false | TRUE | FALSE | True | False) "true"
     ROOT (true | false | TRUE | FALSE | True | False) "false"
     DML_ELEMENT CDATA #IMPLIED
     DML_ATTRIBUTE CDATA #IMPLIED
     DML_VALUE CDATA #IMPLIED
     PEER (true | false | TRUE | FALSE | True | False) "true">
<!ELEMENT REGEXP EMPTY>
<!ATTLIST REGEXP
     STR CDATA #REQUIRED
     SEP CDATA #IMPLIED>
<!ELEMENT DML_CALL (TRIGGER+)>
<!ATTLIST DML_CALL
     NAME CDATA #REQUIRED>
<!ELEMENT TRIGGER EMPTY>
<!ATTLIST TRIGGER
     NAME CDATA #REQUIRED>
]>
```

The NML_MODEL element is the root of the NML file. This contains a set of IMPORTs, and a set of OBJECTs. The DOMAIN argument to the NML_MODEL element is simply an indication to the content engine 110 of the name of the particular domain or application being processed by the content engine.

Some elements that can be used in NML are discussed below.

FILE

The required FILE argument contains the path of the file to import. A typical NML application contains a small set of custom objects and a much larger set imported from standard libraries. A classic example is the Date package, which recognizes common date phrasings: everything from "the last week of the second quarter before last" to "12/19/98". In one embodiment, the IMPORT element directs a compiler to import a library from its FILE argument. For example, <IMPORT FILE="Utils/Date.nml"/> imports the date package. The IMPORT element may look like:

```
<!ELEMENT IMPORT EMPTY>
<!ATTLIST IMPORT
FILE CDATA #REQUIRED>
```

COMMENT

In an embodiment of the present invention, the COMMENT element is used to denote an NML comment (as opposed to a general XML comment), and may be attached to the model as a whole or to any single object. The COMMENT element may look like:

<! ELEMENT COMMENT ANY>

OBJECT

The OBJECT element is the heart of NML. It may look like:

```
<!ELEMENT OBJECT (COMMENT?ATTRIBUTE*>
<!ATTLIST OBJECT
     NAME CDATA #REQUIRED
     EXPR (true | false | TRUE | FALSE | True | False) "true"
          SINGLETON (true | false | TRUE | FALSE | True | False)
"false"
     ROOT (true | false | TRUE | FALSE | True | False) "false"
```

-continued

```
     DML_ELEMENT CDATA #IMPLIED
     DML_ATTRIBUTE CDATA #IMPLIED
     DML_VALUE CDATA #IMPLIED
     PEER (true | false | TRUE | FALSE | True | False) "true">
```

An OBJECT can be thought of as a type in a programming language. Unlike types in programming languages, however, an object in NML has no real implementation. Its purpose is to provide a target for the content engine's 110 mapping of a word, a phrase or a sentence, and a source for the Domain back end's mapping to the application's API. As such, it merely needs provide type information: this is the type to which the phrase and sentence is mapped. The substructure of the Object element gives the explicit instructions for mapping the phrase.

There are eight arguments to the Object element itself. The first argument, NAME, is required, and gives the name of the Object. All references to the Object, specifically those in ATTRIBUTE elements, are done by the NAME of the Object.

The second argument, EXPR, refers to the ability of this object to form expressions—phrases involving "and", "or", ";", "/", or ",". "Monday or Tuesday", for example, forms an expression over the Weekday object. Such expressions are always formed over homogenous objects. Thus "Monday or December 23", for example, would not form an expression over the Weekday object, though they would form an expression over a somewhat more abstract object.

The PEER and DML_arguments control DML generation, described below.

The SINGLETON argument indicates that any instance of this object can take only a single attribute. This is used when an object is, logically, an abstract superclass of several objects, only one of which can be represented. The MAX attribute declaration (see below) is not adequate to control this case, since the MAX attribute declaration controls the number of instances of a single attribute object: this controls the number of attribute objects.

The ROOT argument indicates whether an instance of this object can be at the root of an instance NML tree. An Object contains an optional comment (see above) and a set of ATTRIBUTES. If OBJECT is analogized to a type in a programming language, ATTRIBUTE is analogous to a member of the type. Reference is by name. The declaration:

```
<OBJECT NAME="HelloWorld">
    <ATTRIBUTE INFER="false" MIN="1" MAX="1" ID="Greeting"/
    gt;
```

indicates that the HelloWorld object has a member of type (object name) Greeting. Note that there is no distinction between attribute name, type name, and member name—all refer simply to the object name of the attribute.

```
<!ELEMENT ATTRIBUTE EMPTY>
    <!ATTLIST ATTRIBUTE
        INFER (true | false | TRUE | FALSE | True | False) "false"
        MIN (0 | 1 | 2) "0"
        MAX (1 | 2 | many) "many"
        ID CDATA #REQUIRED>
```

As mentioned above, ATTRIBUTE declares a subobject or member of an object. Thus, ID="Greeting" says that this object contains a Greeting object as a subobject. First-time NML programmers often comment that there is no distinction between the member name and type, in contrast to most programming languages. To see this, consider the Java HelloWorld class:

```
public class HelloWord {
    public Greeting greeting;
    public Everyone everybody;
}
```

In contrast, the NML equivalent

```
<OBJECT NAME="HelloWorld">
  <ATTRIBUTE INFER="false" MIN="1" MAX="1" ID="Greeting">
  <ATTRIBUTE INFER="true" MIN="1" MAX="1" ID="Everyone">
</OBJECT>
```

would correspond to:

```
public class HelloWord {
  public Greeting;
  public Everyone;
}
```

To see why this is true, consider that the NML Object provides a target for mapping, and that member names distinct from types are only useful when there is more than one object of a specific type as a member. If this were the case in NML, the content engine 110 would be unable to know which object to map to which attribute. In one embodiment, this problem may be solved by permitting multiple attributes of a specific type, and letting the back end sort out their roles in the sentence.

ATTRIBUTE

The ATTRIBUTE element is empty, and has the following arguments:

ID: This argument refers to the object name of the attribute, and must be present. If the name is simple (a single word) it refers to an object in the current NML_ MODEL. If it is qualified, it refers to an object from an imported model. Thus, for example, ID="Date.Date" refers to the Date object of the (imported) Date NML_ MODEL. In one embodiment, objects referenced from imported files must use the qualified name, even if there are no conflicts. Thus, for example, even if there were no "Date" objects except in the "Date" NML_ MODEL, attribute IDs in any file that imported "Utils/Date.nml" must reference the Date object as "Date-.Date". Qualifications of this form do not reference the directory structure at all: even if "Utils/Date.nml" appeared in the IMPORT declaration, "Date.Date", not "Utils/Date.Date" would be the attribute ID of the Date object. Finally, qualifications are always single-level: "Utils.Date.Date" is not a valid attribute ID.

INFER: This argument, when true, instructs the content engine 110 to immediately build this OBJECT whenever an object of the type named in ID is built. In the example:

```
<OBJECT NAME="HelloWorld">
  <ATTRIBUTE INFER="false" MIN="1" MAX="1" ID="Greeting">
  <ATTRIBUTE INFER="true" MIN="1" MAX="1" ID="Everyone">
</OBJECT>
```

whenever an Everyone object is built, a HelloWorld object containing it as an attribute is also built. By constrast, the creation of a Greeting object does not infrer the creation of the HelloWorld object. The default value for INFER is false.

MIN: This argument indicates the minimum number of attributes of this ID that this object must have. In the example, a HelloWorld object must have at least one Greeting attribute and one Everyone attribute. The values of MIN can be 0, 1, or 2, with a default of 0. The set of possible values may be expanded if a need is ever found. Often the minimum cardinality of an object is known. For example, a book must have a title. This can be exploited in the mapping process by deleting objects which do not achieve the minimum cardinality for an attribute.

MAX: This argument indicates the maximum number of attributes of this ID that this object must have. In the example, a HelloWorld object must have at most one Greeting attribute and one Everyone attribute. The values of MAX can be 1, 2, or many, with a default of many. The set of possible values may be expanded if a need is ever found. Often the maximum cardinality of an object is known. For example, a book must have only one title. This can be exploited in the mapping process by deleting objects which do exceed the maximum cardinality for an attribute.

An extended example using NML is included in the attached appendix on the CD, which is hereby incorporated by reference herein.

3. DML

The NML document produced the mapper 220 can, however, be too cumbersome for easy processing. In one embodiment, the mapping algorithm described in detail below creates a node in the NML instance object for each phrase successfully mapped. Some of these phrases have no semantic significance in the sentence. Moreover, many separate phrasings may be used to create the same logical object. Since the NML objects are closely tied to the phrasings used, multiple possible NML objects are used to denote the same logical object. Further semantic processing of the NML instance is required before the results can be used to populate a database or launch a search query.

Consider the NML models that recognizes an "Electrical-Current" object. There are many ways in English to specify a device's electrical current. One can refer to current or amperage; refer to the value as an English string ("forty-five" or "one hundred and seventy five") or as a number (45 or 175); attach the units implicitly ("amperage 65") or explicitly ("current 65 amps"); or attached to the value ("65A"); and so on. Each of these variations is captured in an NML model as a separate object; however, an application is dependent only upon the fact that current is specified, the units specified, and the specified value. In the ideal case, this is captured as an XML element in a document:

<CURRENT UNIT=Amp VALUE=65/>

This element is an element of a Domain Markup Language designed for electrical devices. It is automatically extracted from any NML instance corresponding to a text fragment which describes the logical entity "65 amps".

The Domain Markup Language corresponding to an NML model is specified in the NML model itself, with one specific NML Element and three attribute declarations. These are described here:

```
DML_CALL
<!ELEMENT DML_CALL (TRIGGER+)>
  <!ATTLIST DML_CALL
    NAME CDATA #REQUIRED>
  <!ELEMENT TRIGGER EMPTY>
  <!ATTLIST TRIGGER
    NAME CDATA #REQUIRED>
```

This element directs the DML Generator 230 to begin a new DML instance with a root element whose name is the required attribute of DML_CALL, whenever an NML Element whose name corresponds to a TRIGGER is detected in the NML Instance. For example,

```
<DML_CALL NAME="CURRENT">
  <TRIGGER NAME="SimpleAmperageObject"/>
  <TRIGGER NAME="SimpleCurrentObject"/>
</DML_CALL>
```

Directs the DML Generator to begin a new DML Instance with root element CURRENT whenever an instance of either a SimpleAmperageObject or a SimpleCurrentObject is detected in the NML Instance.

The following three attributes attach to any NML OBJECT, ENUMERATION, CALLBACK, PATTERN, or ATTRIBUTE, and control the creation of DML Elements and Attributes, and (optionally) setting the values of DML Attributes. They are described below.

DML_ELEMENT

This attribute optionally appears with a name (e.g., DML_ELEMENT="Current"). If absent, the name is assumed to be the NAME of the NML OBJECT, ENUMERATION, PATTERN, or CALLBACK, or the ID of the NML ATTRIBUTE. It directs the creation of a DML Element of type name, whenever the corresponding NML structure is encountered in the NML instance. This differs from DML_CALL in that the DML Element is not created as the root of a new DML structure; rather, the new element is embedded as a subobject of any containing DML Element. This will be explained in more detail, below, when the DML generation algorithm is explicated.

Examples:

```
<OBJECT NAME="Current" DML_ELEMENT="CURRENT">
```

Directs the creation of a DML Element named CURRENT whenever an NML Object named Current is encountered in the NML Instance tree. Exactly the same declations would apply for ENUMERATION, CALLBACK, or PATTERN, with exactly the same effect.

```
<OBJECT NAME="Current" DML_ELEMENT="CURRENT">
  <ATTRIBUTE ID="AmpDeclaration"
  DML_ELEMENT="Amperage".../>
```

This declaration directs the creation of a DML Element named CURRENT whenever an NML Object named Current is encountered in the NML Instance tree. In addition, if the Current object had an AmpDeclaration subobject, then an Amperage DML_ELEMENT would be created as a sub-element of CURRENT, as can be seen in the following:

| NML Instance | DML Instance |
|---|---|
| <OBJECT NAME="Current"...> | <CURRENT... |
| <OBJECT NAME="AmpDeclaration"> | <Amperage ...> |
| ... | ... |
| </OBJECT> | </Amperage> |
| </OBJECT> | </CURRENT> |

DML_ATTRIBUTE

This attribute optionally appears with a name (e.g., DML_ATTRIBUTE="Current"). If absent, the name is assumed to be the NAME of the NML OBJECT, ENUMERATION, PATTERN, or CALLBACK, or the ID of the NML ATTRIBUTE. It directs the creation of a DML Attribute of type name, whenever the corresponding NML structure is encountered in the NML instance. The new attribute is attached as an attribute of the nearest containing DML Element, generated either from a DML_CALL or DML_ELEMENT declaration. This will be explained in more detail, below, when the DML generation algorithm is explicated.

Examples:

```
<ENUMERATION NAME="VoltWord"
DML_ATTRIBUTE="VoltUnit" >
  <IDENTIFIER TYPE="Noun" LITERAL="gigavolt"
  UNKNOWN="false" />
  <IDENTIFIER TYPE="Noun" LITERAL="kilovolt"
  UNKNOWN="false" />
  <IDENTIFIER TYPE="Noun" LITERAL="megavolt"
  UNKNOWN="false" />
  <IDENTIFIER TYPE="Noun" LITERAL="millivolt"
  UNKNOWN="false" />
  <IDENTIFIER TYPE="Noun" LITERAL="volt"
  UNKNOWN="false" />
</ENUMERATION>
```

The above code directs the creation of a DML Attribute named VoltUnit whenever an NML Object named VoltWord is encountered in the NML Instance tree. The value of the attribute, unless directly specified by a DML_VALUE declaration (see below), is taken to be the literal which generated the VoltWord object, and thus:

```
<ENUMERATION NAME="VoltWord">
  <IDENTIFIER LITERAL="gigavolt"/>
</ENUMERATION>
```

generates the DML Attribute and value VoltUnit="gigavolt". This is attached to the containing DML_ELEMENT, e.g.

```
<OBJECT NAME="Voltage" DML_ELEMENT="Voltage" >
  <ATTRIBUTE INFER="true" MIN="0" MAX="1" ID="VoltWord" />
...
  </OBJECT>
```

Coupled with the VoltWord declaration above, gives the following NML Instance and DML instance for the word "gigavolt", as illustrated below:

| NML Instance | DML Instance |
|---|---|
| <OBJECT NAME="Voltage"...> | <Voltage VoltUnit="gigavolt"...> |
| <ENUMERATION NAME= "VoltWord"> | ... |
| <IDENTIFIER LITERAL= "gigavolt"/> | </Voltage> |
| </ENUMERATION> | |
| </OBJECT> | |

DML_VALUE

DML_VALUE is an optional adjunct to DML_ATTRIBUTE, and permits an NML programmer to override the default value assigned to an attribute by the DML Generation procedure. This is most often used when synonyms or multiple phrasings can appear, and a normalized value is desired.

B. Functionality of the Content Engine

Figure 4:
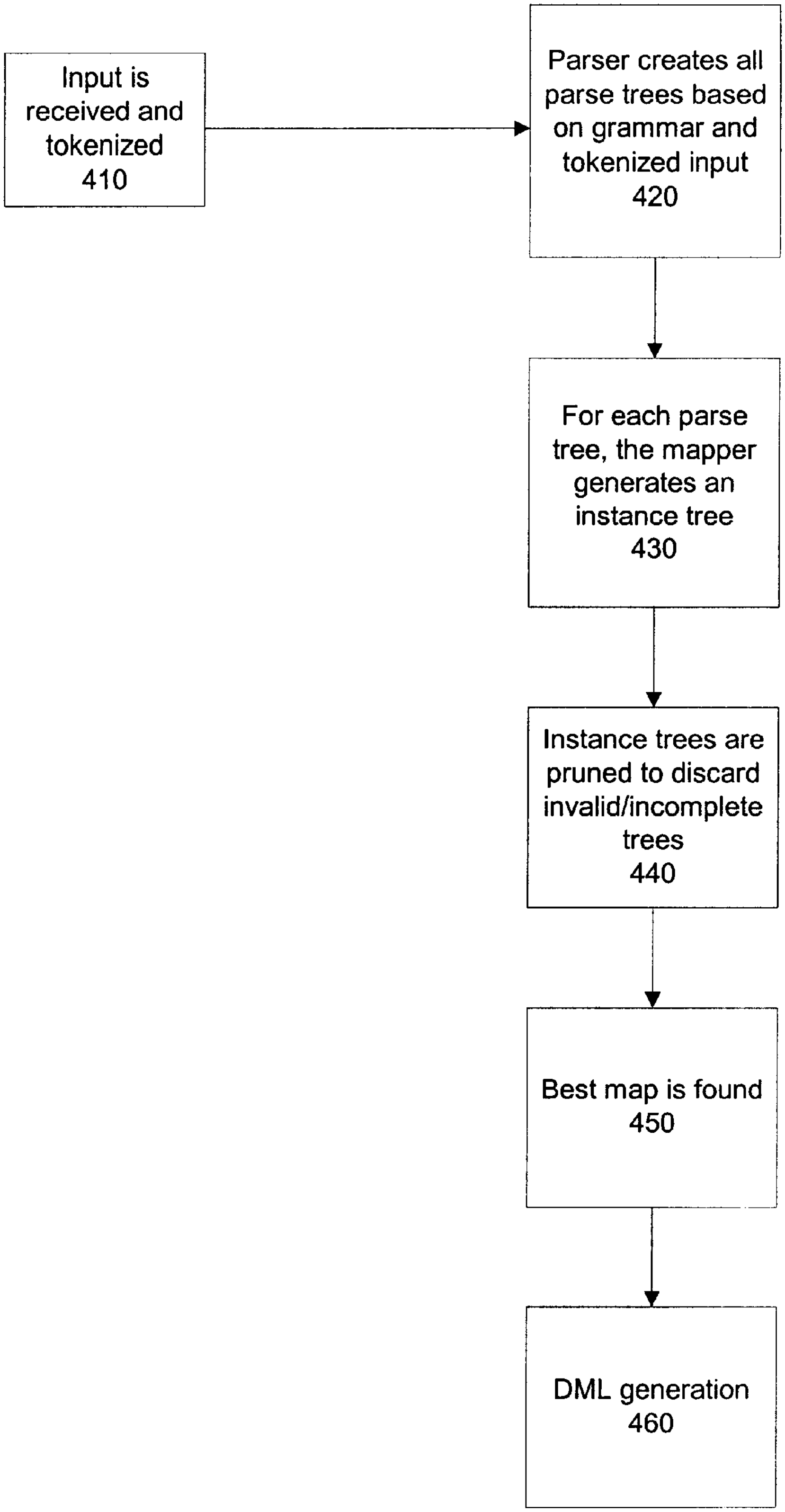
FIG. 4 is a flowchart illustrating the functionality of the content engine.

FIG. 4 is a flowchart illustrating the functionality of the content engine 110 in accordance with an embodiment of the present invention. As can be seen from FIG. 4, the content engine 110 receives the input 410 and tokenizes it. The parser 210 then creates 420 all the parse trees based on the tokenized input and the grammar from the grammar storage 170. Next, for each parse tree, the mapper 220 generates 430 an instance tree based on the application domain specific NML provided by the NML Model Module 140. The mapper 220 then also prunes 440 the instance trees, and then chooses 450 the best map. Finally, the DML generator 230 uses this best map to generate 460 the appropriate DML. These steps are discussed in detail below.

The functionality of the content engine 110 outlined in FIG. 4 can be used both for content synthesis and for retrieving data. For content synthesis, the input received 410 may, for instance, be a catalog of items (and their descriptions) offered by an e-commerce site. For retrieving data, the input received 410 may, for instance, be a search query by a user. In the case of content synthesis, the DML generated 460 may be used to populate a database, while in the case of data retrieval, the DML generated 460 may be used to search a database that has been previously populated.

The input is tokenized 410 by the content engine 110. In one embodiment of the present invention, tokens are simply the words in the input text. However, multiple words may sometimes be treated as a single token, for example, the two or more words that form a name such as San Francisco, or New York City. Multiple words that form a compound noun or other concepts such as dates, times, number patterns etc., may also be aggregated into a single token.

1. Parsing

Once the input is tokenized 410, the parser 210 generates parse trees from the tokenized input based on the grammar obtained from the grammar storage 170. In one embodiment, the parser 210 creates all possible parse trees.

The parser 210 creates parse trees, similar in form to the parse tree (conceptually) created by a compiler from a program. The leaves of this tree are the tokens (or words of the input text); the internal nodes represent phrases and subunits of the sentence, where each node represents the subunit containing all the tokens descended from that node. The root node represents the sentence itself.

Figure 5A:
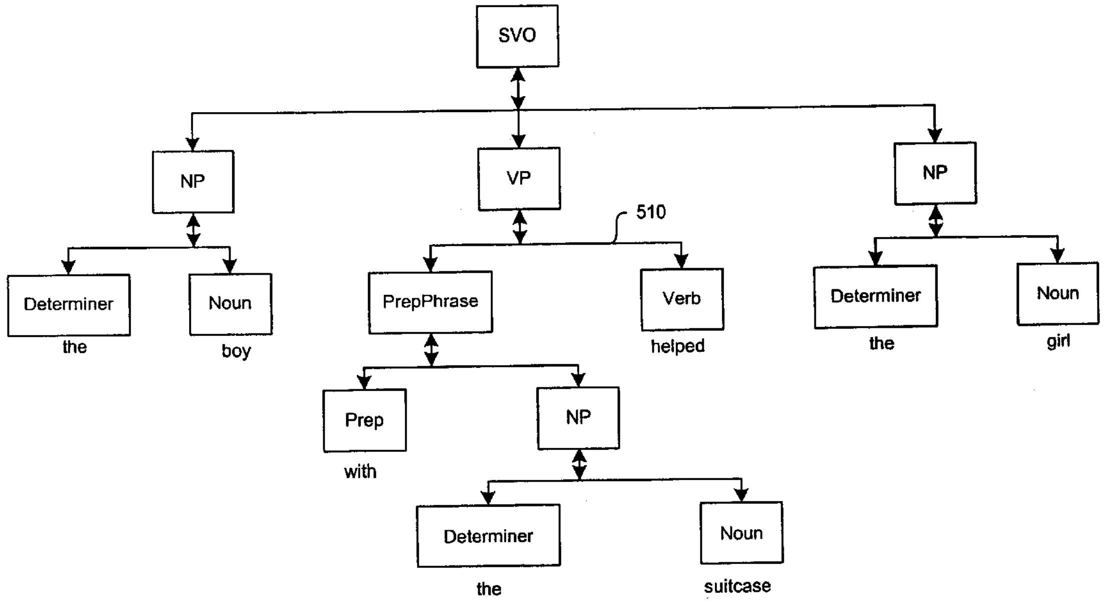
FIG. 5A illustrates one possible parse tree for the sentence "The boy helped the girl with the suitcase."
Figure 5B:
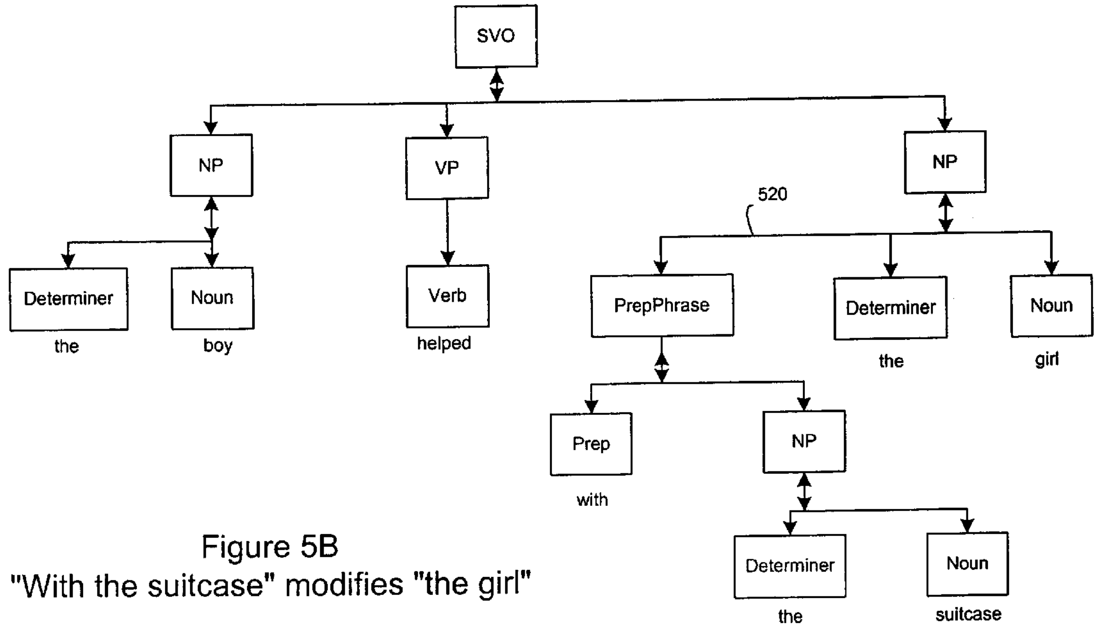
FIG. 5B illustrates another possible parse tree for the sentence "The boy helped the girl with the suitcase."

To see in detail how this is done, consider the ambiguous sentence "The boy helped the girl with the suitcase." This sentence leads to two parse trees, which are distinguished by the placement of the prepositional phrase "with the suitcase." In the first tree, the phrase "with the suitcase" modifies the verb "help." In the second tree, the phrase modifies the noun "girl." FIG. 5A depicts the first tree, while FIG. 5B depicts the second tree. In these descriptions, the boxes mark the recognized grammar symbols such as "SVO" (for Subject-Verb-Object), "NP" (Noun Phrase), and so on. The generating tokens are beneath the lowest-level boxes in the figure.

Figure 5C:
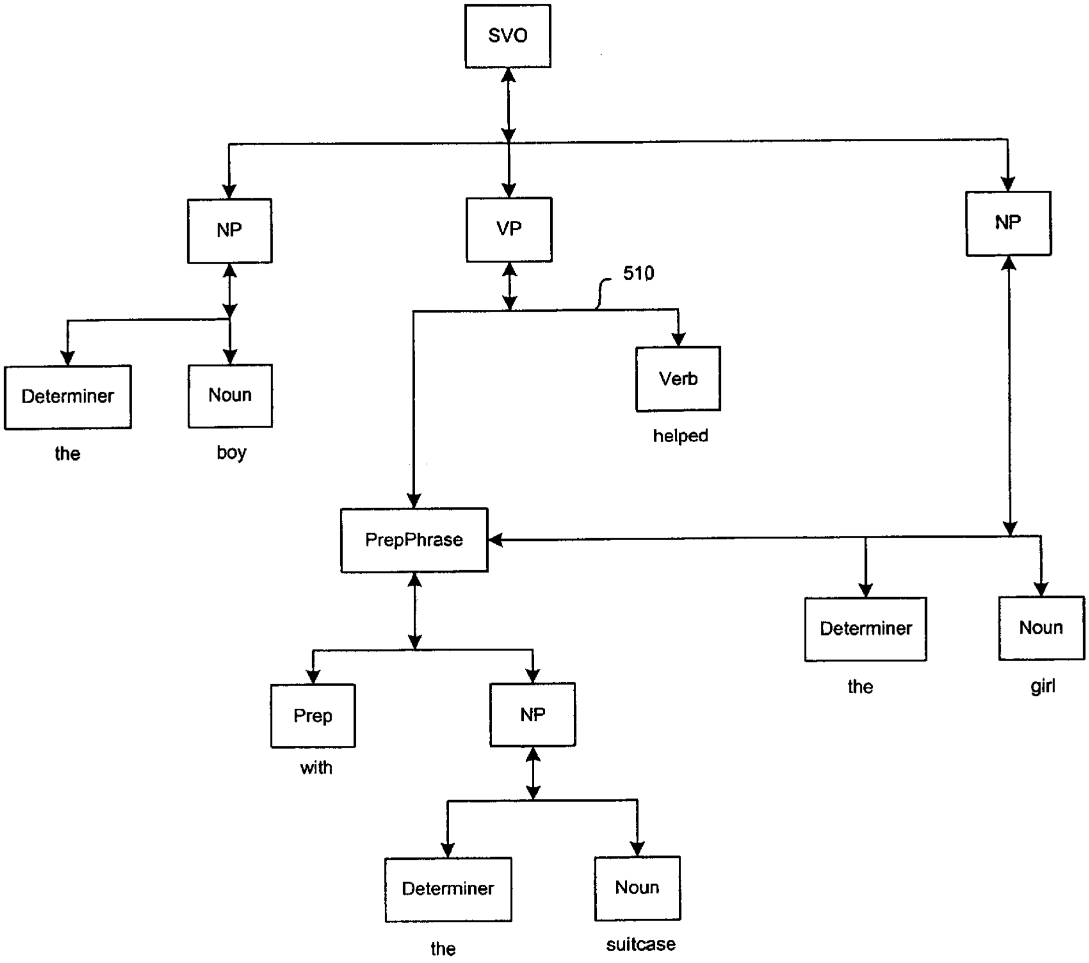
FIG. 5C illustrates how the different parse trees for the sentence "The boy helped the girl with the suitcase" can be represented as a single parse DAG.

Consideration of FIGS. 5A and 5B reveals that the nodes of the trees are the same, and are distinguished only by the edge into the node representing the phrase "with the suitcase." In the first case, the edge 510 runs from the node representing the verb phrase "helped"; in the second case, the edge 520 runs from the node representing the phrase "the girl." This aspect leads one to the conclusion that both parse trees can be represented in a single parse Directed Acyclic Graph ("DAG"). The DAG is depicted in FIG. 5C. As can be seen from FIG. 5C, the DAG itself contains exactly the same number of nodes as each of the two component parse trees, and only one more edge than either of the two component parse trees.

The parser 220 can employ any parsing algorithm. In one embodiment, the parsing algorithm of Cocke-Younger-Kasami may be used. Details of the Cocke-Younger-Kasami algorithm can be found in the *Introduction to Formal Language Theory*, Harrison, M. A., Addison-Wesley, 1978. A sample of the Cocke-Younger-Kasami algorithm is shown below in Tables 12 A–E. While the algorithm shown below provides a single parse of a sentence, it may be modified to generate all parses of the sentence.

The core of this algorithm is an (n+1)×(n+1) table, where "n" is the number of tokens in the parse. The tokens are here denoted $a_0 \ldots a_{n-1}$, and the table elements $T_{0,0}, \ldots, T_{n,n}$. The upper half of the table is filled from i,i+1 to n, n in the order given below. The items just above the diagonal are filled with the grammar nonterminals that directly derive the relevant token. The items in the remaining token are filled in as follows:

$$T_{i,j}=\{A|\Rightarrow BC, B\in T_{i,k}, C\in T_{k,j}, i+1\leqq k\leqq j-1\}.$$

The result of these equations is that, at the completion of the algorithm, $T_{i,j}$ contains precisely the set of nonterminals which derive the phrase beginning at $a_i$ and terminating in $a_j$. $T_{0nj}$ then contains the set of non-terminals which derive the entire sentence.

```
for (i = 0; i < n; i++) {
  t[i] [i+1] = {A | A=>a1}
}
for (d = 2; d <= n; d++) {
     for (i = 0; i <= n - d; i++) {
          j = d + i;
          for (k = i+1; k < j; k++) {
                    t[i] [j] = t[i] [j] ∪ {A | A=>BC,
                                                    B ∈ t[i] [k] ,
                                                    C ∈ t[k] [j]};
               }
          }
}
```

It can be seen from the above pseudocode that the order of magnitude of the time taken by this parsing algorithm run is proportional to $PN^3$, where N is the number of words in the sentence and P is the number of distinct parses. The algorithm is shown running on the string aabb, given the Grammar3.

S⇒AB

S⇒PB

P⇒AS

A⇒a

B⇒b.

The initial matrix is shown below.

| $T_{0,0}$ | $T_{0,1}$ | $T_{0,2}$ | $T_{0,3}$ | $T_{0,4}$ |
|---|---|---|---|---|
| | A | | | |
| | | A | | |
| | | | B | |
| | | | | B |

After the first iteration of the loop with loop variable d, the matrix is:

| $T_{0,0}$ | $T_{0,1}$ | $T_{0,2}$ | $T_{0,3}$ | $T_{0,4}$ |
|---|---|---|---|---|
| | A | | S, P | |
| | | A | S | S, P |
| | | | B | |
| | | | | B |

After the final iteration, the matrix is:

| $T_{0,0}$ | $T_{0,1}$ | $T_{0,2}$ | $T_{0,3}$ | $T_{0,4}$ |
|---|---|---|---|---|
| | A | | S, P | S, P |
| | | A | S | S, P |
| | | | B | |
| | | | | B |

The root of the parse tree is contained in the element T[0][4]—in other words, in the cell in the top-right corner of the matrix. At this point the parsing algorithm terminates and the correct parses are read from the top-right corner of the matrix.

2. Mapping

As discussed above, the mapper 220 generates 430 instance trees for each parse tree based on the application-specific NML provided by the NML module 140. In one embodiment, the mapper 230 then prunes 440 these instance trees to discard invalid and/or incomplete trees. The mapper then chooses 450 the best map. Each of these steps is discussed in detail below.

An object in the instance tree is said to cover a node of the parse tree (equivalently, a node is said to "map" to an object), if the mapper 220 matches the object to the node, by the rules explained below. The goal of the mapping algorithm is to map a single object to the root node of the tree. In one embodiment, if a single NML instance cannot be obtained for a sentence, the system switches to another mapping mechanism that tries to obtain the best set of disjoint NML instances that cover the entire sentence. There are several different methods to perform a partial map of a sentence.

a) Generation of Instance Trees

In one embodiment, instance trees are generated by starting out at the leaf (or terminal) nodes of a parse tree. In brief, a terminal node is created for each token. At each terminal node of a parse tree, all enumerated objects are indexed by the terminal word. An inference process is then executed to create inferred objects. The algorithm then moves up the parse tree, generating a new object at a parent node by composing the objects of the child nodes at the node. At each node there is one child node that is pre-determined to be the main child of the node. The main child corresponds to the grammatical object that plays the central role in the grammatical structure represented by the node. For a noun phrase, this is the head noun, for a prepositional phrase this the prepositional complement, etc.

Objects can be generated in several ways. Specifically, objects can be generated by enumeration from identifiers, enumeration from callbacks, and enumeration from patterns. In addition, objects can also be inferred from other objects. Let us consider each of these in turn.

Enumeration from Identifiers:

An Enumeration is an object created by the presence of a single word or phrase.

```
<!ELEMENT ENUMERATION (COMMENT?IDENTIFIER*)>
<!ATTLIST ENUMERATION
  NAME CDATA #REQUIRED
  EXPR (true | false | TRUE | FALSE | True | False) "true">
```

In the example shown below, the enumeration "Greeting" is created when the word "hello" is encountered, because of the code snippet:

```
<ENUMERATION NAME="Greeting">
  <IDENTIFIER LITERAL="hello">
</ENUMERATION>
```

It is important to note that an Enumeration is in every way identical to an object, except for the fact that an object is always inferred from an existing attribute and an Enumeration is inferred from a word or phrase.

The IDENTIFIER element recognizes a single word that forces creation of the object. The specific word is given in the LITERAL argument.

```
<!ELEMENT IDENTIFIER EMPTY>
<!ATTLIST IDENTIFIER
  MAP CDATA #IMPLIED
  LITERAL CDATA #REQUIRED
  UNKNOWN (true | false | TRUE | FALSE | True | False) "false"
  TYPE (Any | Adjective | Verb | Noun | Adverb | Pronoun |
  Preposition)
"Any">
```

The IDENTIFIER element has no substructure, and can take the following arguments, listed below:

LITERAL: This argument gives the literal string that maps to the object. In general, only the root of a specific verb or noun should appear in the literal argument; the Content Engine will recognize and map tenses, declensions, and all derivative forms of verbs and nouns. For example, <IDENTIFIER LITERAL="have"> will map "has", "had", "having", "has had", and so on, and <IDENTIFIER LITERAL="woman"> will map "women", "women's", "womanly", and so on. LITERAL is the only required argument of IDENTIFIER, and will often be the only argument.

MAP: Occasionally, synonyms are used to indicate a single object, and the semantic processing of the object is independent of which synonym is used. A good example is "stock" and "security". In this case, the back-end code can be simplified if the synonyms are reduced to a single canonical case. MAP does this. If MAP appears, then the recognized literal will be mapped to the string that is given as the argument to MAP. The default value for MAP is the value of the LITERAL argument.

TYPE: This restricts the mapping to the particular part of speech given as the argument. Often, words can assume several different parts of speech. For example, the word "green" is a noun (denoting a patch of grassy land or a color), an adjective, or a verb. It is often desired to restrict an IDENTIFIER to only one of these roles. If Verb is given as the value of TYPE, then only verbs will map to this particular identifier. The default value, ANY, maps any part of speech to this IDENTIFIER.

Enumeration from Callbacks:

Another way in which objects can be created is from Callbacks. The CALLBACK element functions in a fashion similar to ENUMERATION: it is a means for mapping individual tokens in a sentence to OBJECTS. It is designed for the specific case where the set of IDENTIFIERs for a particular OBJECT is very large, changes dynamically, or both.

```
<!ELEMENT CALLBACK EMPTY>
  <!ATTLIST CALLBACK
  NAME CDATA #REQUIRED
```

-continued

```
    EXPR (true | false | TRUE | FALSE | True | False) "true">
    CLASS CDATA #REQUIRED
    PARSER CDATA #REQUIRED
    MAPPER CDATA #REQUIRED>
```

A good example of such a situation is the set of stock symbols, which number in the thousands and which change daily due to IPOs, mergers, and name and symbol changes. For such sets, the use of IDENTIFIERs is unwieldy: the NML file would be very large and in a state of constant update. A better solution is to use a standard relational database, and call it to recognize a stock symbol. The particular example for stock symbols is:

```
<CALLBACK NAME="CompanyFundIndexDbName" EXPR="False"
CLASS="ecCallback.CompanyFundIndexNameDatabase"
PARSER="isCompanyFundIndexName" MAPPER="findCompanyFundIndexSymbol">
    <COMMENT> Each company, fund, and index name or symbol is obtained
  via a callback to method that matches the names in a database.
    </COMMENT>
</CALLBACK>
```

Formally, the CALLBACK element defines a Java class which contains at least two methods: a method which takes a string and returns a boolean (this is named in the PARSER argument), and a method which takes a string and returns another string (this is named in the MAPPER argument). While this was specifically designed with a SQL interface in mind, there is no restriction in the code for this: any Java class having the appropriate methods will do.

In one embodiment, the CALLBACK element may have no structure, and have the following arguments, all of which are required:

CLASS This is the name of the fully-qualified Java class containing the two methods referenced above. The Content Engine will call the method <CLASS>.<PARSER>(token); to recognize the token, and <CLASS>.<MAPPER>(token); (in the example above, "ecCallback.CompanyFundIndexNameDatabase.isCompany FundIndexName(token);" for recognition, and "ecCallback.CompanyFundIndexNameDatabase.findCompanyFundIndex Symbol(token);" for mapping). Thus, the CLASS must be accessible to the Content Engine from the string as given here using the standard Java class loader methods.

PARSER This is the name of the method within CLASS called to do the recognition: it should take a single String argument and return a boolean. This functions exactly as the LITERAL argument to IDENTIFIER; Content Engine will pass the root form of the token, not the token itself, to the parser. Thus, the word "Microsoft's", appearing in a sentence, yields the call "ecCallback.CompanyFundIndexNameDatabase.isCompany FundIndexName(microsoft)". When this returns true, the behavior of the compiler is exactly identical to that produced when "microsoft" had appeared in a list of IDENTIFIERs for this OBJECT.

MAPPER This is the name of the method within CLASS called to map recognized tokens to a canonical form: it should take a String and return a String. This functions exactly as the MAP argument to IDENTIFIER. As with PARSER, Content Engine will pass the root form of the token, not the token itself, to the mapper. To obtain the default behavior of IDENTIFIER, MAPPER should simply return its argument. A richer example is the one cited: ecCallback.CompanyFundlndex-NameDatabase.findCompanyFundlndexSymbol returns the symbol associated with the name. So, for example, ecCallback.CompanyFundlndexNameDatabase.findCompanyFundlndexSymbol (microsoft) returns "msft", as does ecCallback.CompanyFundIndex-NameDatabase.findCompanyFund IndexSymbol(msft).

In an alternate embodiment, CALLBACK 520 may be simplified if the Content Engine 110 adopts an interface-based protocol for its callbacks. In this case, the PARSER and MAPPER arguments to CALLBACK will disappear, and the CALLBACK CLASS will be required to implement the Content Engine 110 callback protocol.

Enumeration from Patterns

A pattern is the third logical equivalent to an enumeration. This is used when a large number of identifiers can be specified by a regular expression. A full description of regular expressions (formally, regular languages) can be found in Aho, Hopcroft, and Ullman, *Introduction to Automata and Language Theory*, Addison-Wesley, 1979. The most simple example of a regular expression is a Social Security Number, which is represented by the regular expression:

```
[1–9][0–9][0–9]-?[0–9][0–9]-?[0–9][0–9][0–9][0–9]
```

which indicates that a social security number is any string which begins with a digit between one and 9, followed by two digits between 0 and 9, an optional dash, two digits between 0 and 9, and optional dash, and then four digits between 0 and 9.

In one embodiment, the content engine 110 accepts any regular expressions specified by the PERL 5 compiler (see http://www.perldoc.com/perl5.6/pod/perlre.html for the current specification). The regular expressions are captured in the STR argument of the contained REGEXP element. Occasionally, it is useful to specify multiple regular expressions in the same pattern, which are separated by an optional SEP character (space by default).

```
<!ELEMENT PATTERN (REGEXP+)>
<!ATTLIST PATTERN
  NAME CDATA #REQUIRED
  EXPR (true | false | TRUE | FALSE | True | False) "true"
  ROOT (true | false | TRUE | FALSE | True | False) "false"
  DML_ELEMENT CDATA #IMPLIED
  DML_ATTRIBUTE CDATA #IMPLIED
  DML_VALUE CDATA #IMPLIED
  PEER (true | false | TRUE | FALSE | True | False) "true">
<!ELEMENT REGEXP EMPTY>
<!ATTLIST REGEXP
  STR CDATA #REQUIRED
  SEP CDATA #IMPLIED>
```

Inference:

Apart from the enumeration techniques discussed above, one more way in which an instance object can be created is by inference. Inference is when the presence of a modifier can imply the existence of an object, even when the object is not explicitly identified. This can occur through ellipsis, or, more commonly, because the underlying object is abstract and is not always (and perhaps never) explicitly identified.

Consider, for example, the generic object "Weather," which has attributes "Temperature," "Precipitation," "Outlook," and "Location." Though such an object may be explicitly identified (as, for example, by the keyword "weather") it will often not be, as in the question "What is the temperature in San Francisco?" In this case, the request for the "Weather" object is inferred from the request for its attribute "Temperature."

Not all attributes infer the presence of a modified object. In the example above, the city San Francisco is a "Location" for "Weather," but does not infer a "Weather" object. "Temperature," however, does. A developer declares that a particular attribute infers the existence of the object. In the map, inferred objects are created immediately along with the inferring attribute, along with an "inferred" tag.

In one embodiment of the present invention, inference is related to type inference in an object-oriented language in a deep and non-obvious fashion. In general, if a type A is a subclass of a type B in an object-oriented language, then every instance of A bears within it an instance of type B. Put better, one can think of A as B with additional properties. Thus, creation of an instance of A forces the creation of an instance of B. In some sense, then, the declaration of a sub-type in a program is a declaration of an inferencing attribute.

In an alternate embodiment, rather than encapsulating the inferencing attribute in a sub-type declaration, the inferencing attribute may directly infer the object. In this embodiment, the attribute can be directly recognized, and the inferred object can be built directly from it.

As discussed above, the INFER element is an argument of an attribute, which, when true, instructs the content engine 110 to immediately build the OBJECT whenever an object of the type named in ID is built. In the example:

```
<OBJECT NAME="HelloWorld">
  <ATTRIBUTE INFER="false" MIN="1" MAX="1" ID="Greeting">
  <ATTRIBUTE INFER="true" MIN="1" MAX="1" ID="Everyone">
</OBJECT>
```

whenever an Everyone object is built, a HelloWorld object containing it as an attribute is often built. The default value for INFER is false.

As the objects are created, the "handle" of the instance tree must be adjusted. It may be helpful to define some terminology here. When an English phrase or sentence is parsed, there is always a dominant element. In the case of a subject-verb-object sentence, for example, the dominant element is the verb phrase; in the case of a noun phrase, it is the head noun; in the case of an adjectival phrase, it is the adjective. This element is referred to as the head word or head phrase of the phrase.

As the mapper 220 progresses, it creates trees of objects centered on nodes of the parse tree. Such a tree of objects, centered on a node of the parse tree, is said to be a map of the node. The link between a tree of objects and the parse tree is a single object within the map, called the handle of the map. The handle of the map may be thought of as the root of the map of the head phrase of the mapped node in the parse tree. Its role (and how the handle moves during the mapping process) will be explained below.

There is a fundamental equivalence between the object attribute tree in a program and the modifier hierarchy in a parse tree of a sentence. In the parse of a sentence, various words are the anchors of their phrase. For example, in any noun phrase, the noun is the anchor. The other sub-phrases are the modifiers. The anchor of the phrase defines the object in the component tree; the modifiers are attributes of the object. If an object Girl had been declared with identifier "girl" and attribute Carrying with identifier "with", then the sentence "the boy helped the girl with the suitcase" would have its Object mapped to a component Girl with attribute Carrying. However, if Girl did not have an attribute Carrying then the object would have been mapped to a component Girl.

The easiest way to see how an an object grows by accumulating attributes is to imagine two objects of the same type as composing into a single object by merging their attributes. Consider the following snippet from the HelloWorld programs:

```
<OBJECT NAME="HelloWorld">
  <ATTRIBUTE INFER="true" MIN="1" MAX="1" ID="Greeting">
  <ATTRIBUTE INFER="true" MIN="1" MAX="1" ID="Everyone">
</OBJECT>
```

In this case, both the Greeting object and the Everyone object create a HelloWorld object through the inference mechanism. Both of these HelloWorld objects have a missing, required attribute: once merged into a single object, the required attributes for both are complete.

Two objects that are unrelated in the sentence, for example, should not compose: they refer to different semantic entities within the sentence, unless there is some overlying grammatical link between them. Consider the sentence "hello, dolly and thanks, everyone." The HelloWorld objects created by the Greeting object containing "hello" and the Everyone object containing "everyone" should not merge: this would imply that there was a single phrase containing both Greeting and Everyone, and this is false. A second method that might be imagined would have an object adding as attributes only the maps of the modifiers of its head phrase. However, in English the semantic analysis of a sentence often contains inversions of its grammatical structure. For example, in the sentence "Show me the price of Microsoft," the main semantic object is "the price of Microsoft," and the verb phrase "Show" is, semantically, a modifier. Nonetheless, in the parse the head phrase is "Show," which is modified by "the price of Microsoft."

The rule used by the Content Engine 110 is very simple. A map may add as an attribute:

(1) The map of a modifier of its handle; or (2) The map of a phrase modified by its handle.

In case (1), the handle remains unchanged. In case (2), the handle moves to the attribute, so that the handle remains at the map of the head phrase of the parse. Thus, in our example, assume that a Stock object had been created for the phrase "the price of Microsoft". The handle of this map is the Stock object. "the price of Microsoft" modified the verb "show", and so under rule (2) the Stock object can add a Show attribute. When it does, the handle of the map moves to the Show attribute of the Stock object. In other words, the root of the map is no longer the handle.

Occasionally, it's helpful to force the handle to move to the root of the map. This happens when the programmer can guarantee that no further attributes can be added to this map from the modifiers of the head phrase. A good example occurs in the case considered in the previous section, where is clear that no further modifiers of the verb "show" will become attributes of the root Stock object. In order to permit this, inference moves the handle of the map to the root of the map. An inferred object's handle is always the root of the map.

Details of the Mapping Algorithm

Figure 6:
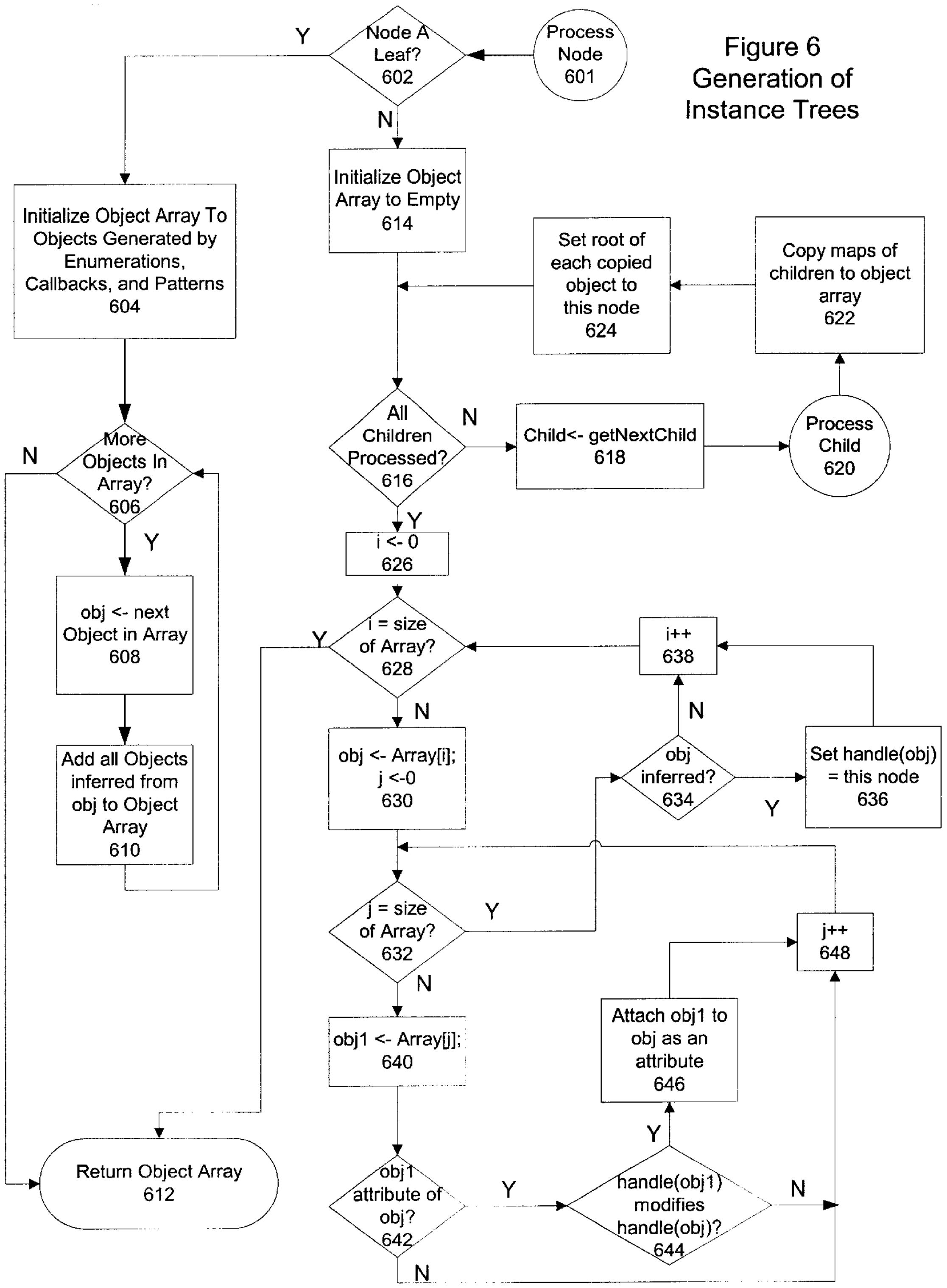
FIG. 6 is a flowchart illustrating the generation of instance trees by the mapper.

Further details regarding the generation 410 of instance trees are outlined in the flowchart depicted in FIG. 6. Based on the application-specific NML obtained from the NML module 140, the mapper 220 starts the generation 410 of instance trees by considering one process node 601. The mapper 220 first determines 602 whether the node it is considering is a leaf node. If the node is determined 602 to be a leaf node, the object array is initialized 604 with generated objects.

Once the object array is initialized 604 by objects generated by enumeration, the mapper 220 iterates 606–610 over all the objects in the array. For each such existing object, all objects that can be "inferred" from the existing object are added 610 to the object array. "Inference" is the only other way in which instance objects are generated, as described above. Once it is determined 606 that there are no more objects in the array, the object array is returned 612.

Referring back to the determination 602 of whether the node being processed is a leaf node, if the node is not a leaf node, the object array is initialized 614 to empty. The mapper 220 then determines 616 whether all the children of the node have been processed. If all the children of the node have not been processed, the next child node is selected 618 and processed 620. The maps of the child node are are copied 622 to the object array, and the root of each copied object is set 624 to the child node.

If all the children of the node have been processed, then the attachment of attributes to objects is performed 626–648. Each object of the array is selected in turn as the object to which to attach attributes. This object is denoted as obj and is indexed by the variable i. Each object of the array is selected in turn using the index j initialized 630 to zero. The object indexed by j is examined 640 and is henceforth refered to as obj1. The goal of steps 640–648 is to determine whether obj1 can be attached as an attribute of obj, and to perform the attachment if it is possible. First, obj is examined 642 to see if it has as an attribute an object whose name is the name of obj1. If this is true, then the second test is performed 644: whether the handle of obj1 modifies the handle of obj. If this is true, then obj1 is attached 646 as an attribute of obj. Following this, or if either of the tests 642, 644 failed, the next item in the array is selected 648 as obj1 648.

Once the attributes have been attached to obj, the final step is the reassignment of obj's handle, steps 634–636. The handle of obj is set to obj itself if obj has been inferred; if not, the handle of obj is left undisturbed.

b) Pruning of Instance Trees

In one embodiment, once the instance trees are generated 430, pruning 440 is performed by the mapper 220 to discard invalid/incomplete instance trees. In one embodiment, for each map, a list of the tokens mapped into the instance tree are recorded; an instance tree for the sentence which does not map all the verbs and nouns are discarded.

Figure 7:
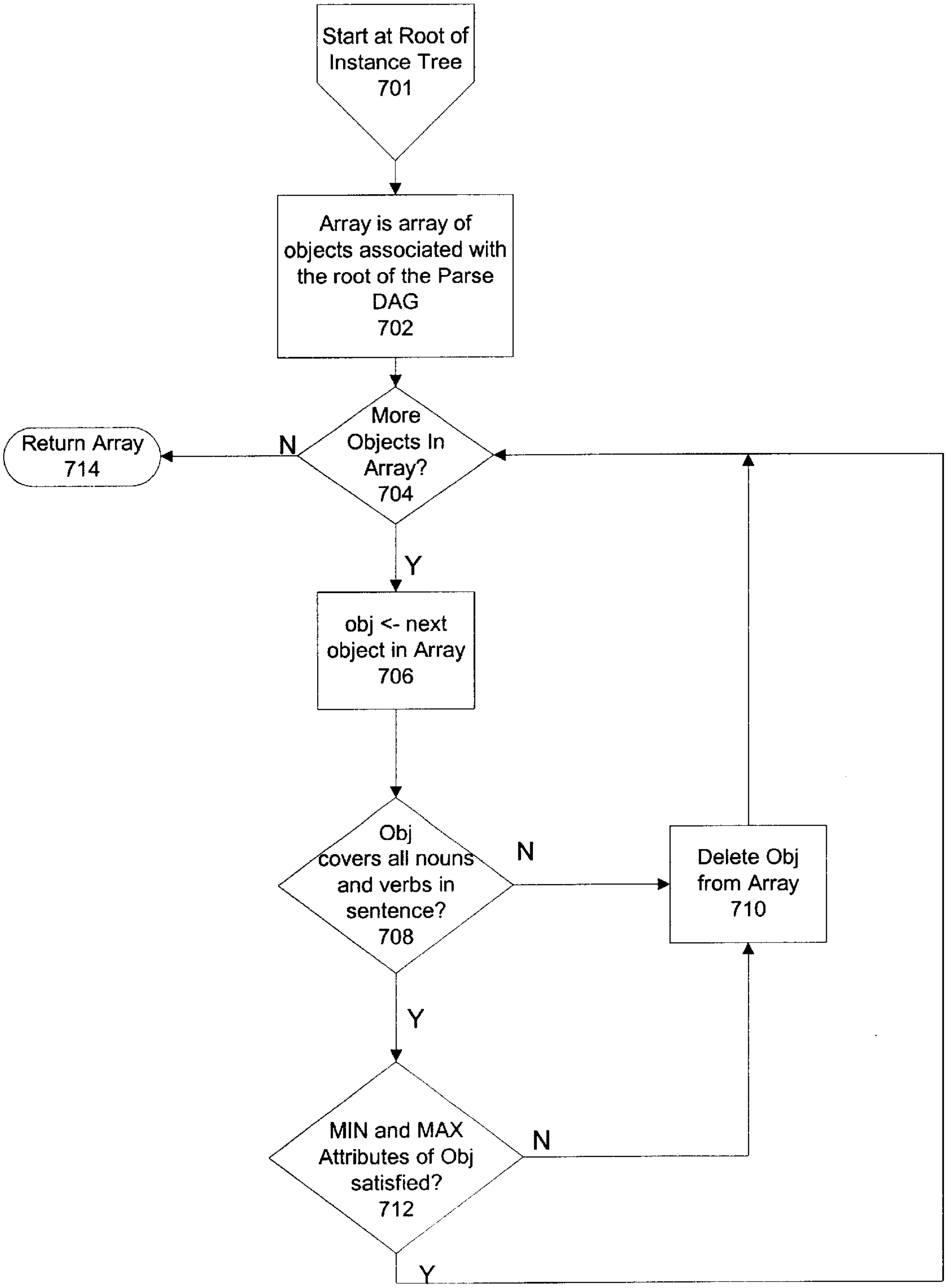
FIG. 7 illustrates the pruning of invalid instance trees after all instance trees have been generated by the mapper.

An algorithm employed for pruning in one embodiment of the present invention is demonstrated in the flowchart in FIG. 7. Pruning starts 701 at the root of an instance tree. An array is designated 702 as the array of objects (i.e. components of the instance tree) associated with the root of the parse DAG. The content engine determines 704 whether there are any more objects in the array. As long as there are more objects remaining in the array, obj is assigned 706 the next object in the array. The content engine then determines 708 whether the obj covers all nouns and verbs in the sentence. If not, the object is deleted 710 from the array. If obj does cover all nouns and verbs in the sentence, the content engine determines 712 whether the MIN and MAX attributes of the object are satisfied. If they are not satisfied, the object is deleted 710 from the array. If these attributes are satisfied, the content engine loops back to determine 704 whether there are any more objects left in the array. When such determinations have been made for all the objects in the array, the array is returned 714. Thus, only those instance trees that account for all the verbs and nouns of the given sentence, and which satisfy the MIN and MAX attributes, are retained.

In another embodiments, a different algorithm may be used to discard instance trees. In still another embodiment, the step of pruning 440 need not be performed at all.

c) Choosing the Best Map

Figure 8:
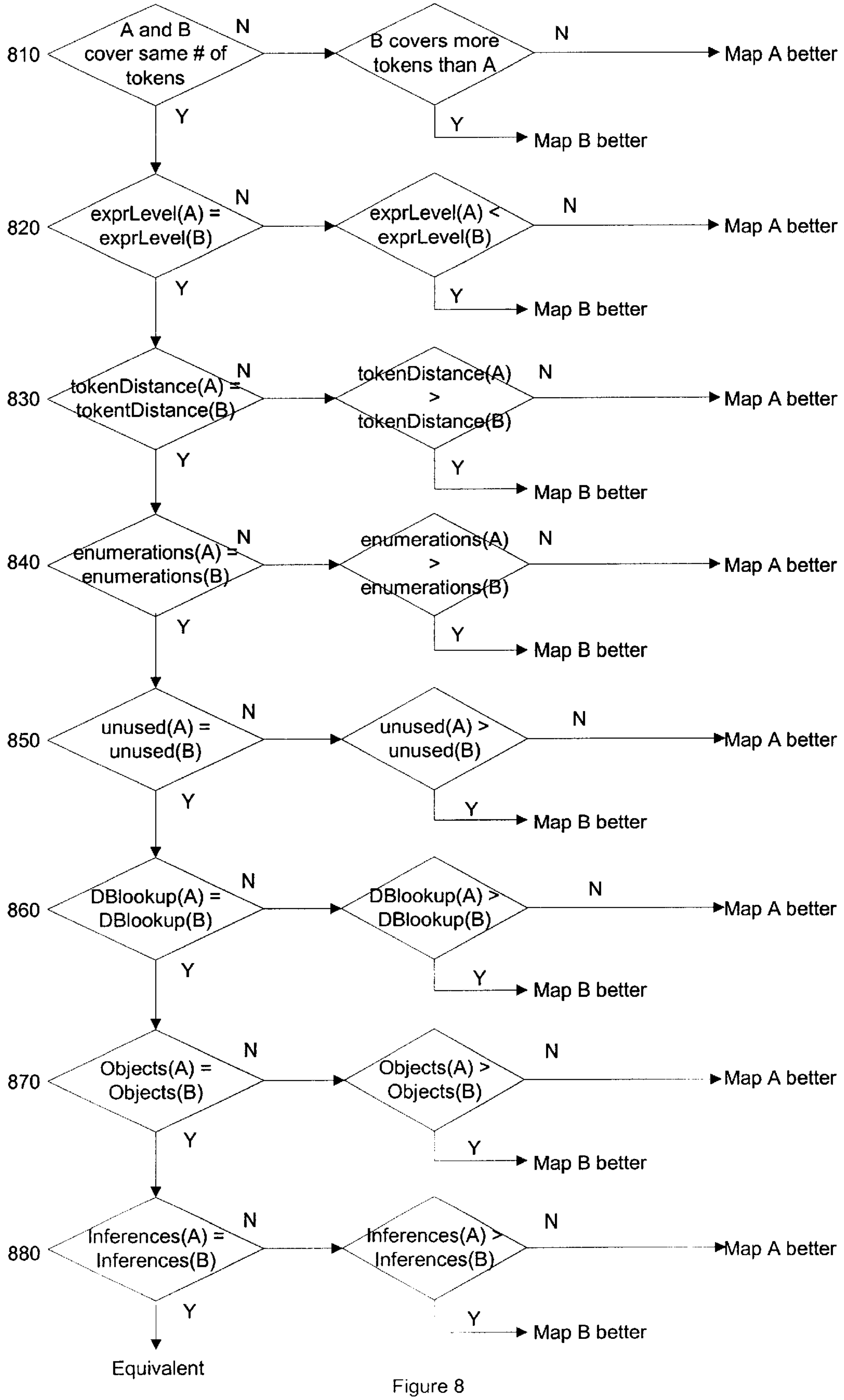
FIG. 8 illustrates a cost function employed by the mapper to pick the best map from the valid instance trees in accordance with an embodiment of the present invention.

Finally, the instance tree which reflects the best map within the specified domain is chosen 450. FIG. 8 illustrates how the best map is chosen 450 in one embodiment of the present invention. One skilled in the art will note that the "best" map can be chosen 450 in several other ways.

In the embodiment illustrated in FIG. 8, a cost function is used to impose a partial order on maps of a sentence. The maps of the sentence which are maximal under this partial order are chosen to be the best maps of the sentence, and returned as the result(s) of the mapping procedure.

The cost function in FIG. 8 compares two maps (map A and map B), and returns which is the superior map. It consists of a set of eight comparisons 810–880, run in order. The kth comparison in the sequence is used only if the preceding k−1 comparisons have resulted in ties; thus, it is a hierarchy of tiebreakers. These are, in order:

810: If the number of tokens covered by the two maps is not identical, the superior map is the map covering the most tokens. The reasoning here is straightforward: a better map covers more tokens.

820: If #1 does not indicate the better map, choose the map whose topmost expression (maps joined by the words "and" or "or", or the punctuation symbol ",") is furthest from the root of the map. The reasoning here is that a conjunction can bind two phrases of arbitrary size. Consider, for example, the phrase "red feather and gold sheath pen". This phrase is ambiguous: it could refer either to two objects (a red feather and a gold sheath pen) or to a single object (a pen with a red feather and a gold sheath). The two maps would be distinct—the first, two-object map, has its expression at the root; the second, one level down, joining attributes of a single object. This rule resolves in favor of binding phrases at the lower of the possible levels, i.e., conjoining the smaller possible units. In this example, preferring the second map (pen with a red feather and a gold sheath) over the first. When a map has no expressions, the distance of an expression from the root is taken to be infinite.

830: If the maps are equal under criteria #1 and #2, choose the map with the least distance between the tokens. In an n-token text fragment, tokens are assigned indices. The leftmost token is assigned index 0, and the token to the immediate right of the token with index i is assigned index i+1. This rule chooses the map with the smallest difference in index between the leftmost and rightmost tokens covered by the map. So, for example, given the phrase "red felt pen tip", with indices red=0, felt=1, pen=2, tip=3, and map A covering "red felt tip" and map B covering "felt pen tip", map B would be chosen as it has the least distance between its covered tokens (3−1=2 compared to 3−0=3). The reasoning here is that compact maps are preferred over disjoined maps.

840: If the maps are equal under criteria #1-#3, choose the map with the fewer objects created by enumerations.

850: If the maps are equal under criteria #1-#4, choose the map with the fewer unused primitives—these are words and phrases in the text fragment unused by the relevant map.

860: If the maps are equal under criteria #1-#5, choose the map with the fewer objects created by database lookup.

870: If the maps are equal under criteria #1–#6, choose the map with the fewer NML objects.

880: If the maps are equal under criteria #1–#7, choose the map with the fewer inferred objects.

If the maps are equal under all eight criteria, then they are incomparable (and thus equal) under the partial order, and are regarded as equally valid maps.

The different criteria of the cost function illustrated in FIG. 8 break into three distinct groups. The first group, comprising rules 1–2 and 5, are based on the structure of the sentence. Maps which use the most tokens, contained in a compact group, are preferred over maps which use fewer tokens spread further over the text segment. Rule 3, as mentioned above, resolves ambiguities with respect to expression phrases in favor of the tightest possible binding. Rules 4 and 6–8 comprise another major group, and act together to prefer maps which have fewer objects. Together, they can be read as preferring maps with less structure over maps with more created structure.

3. DML Generation

Figure 9:
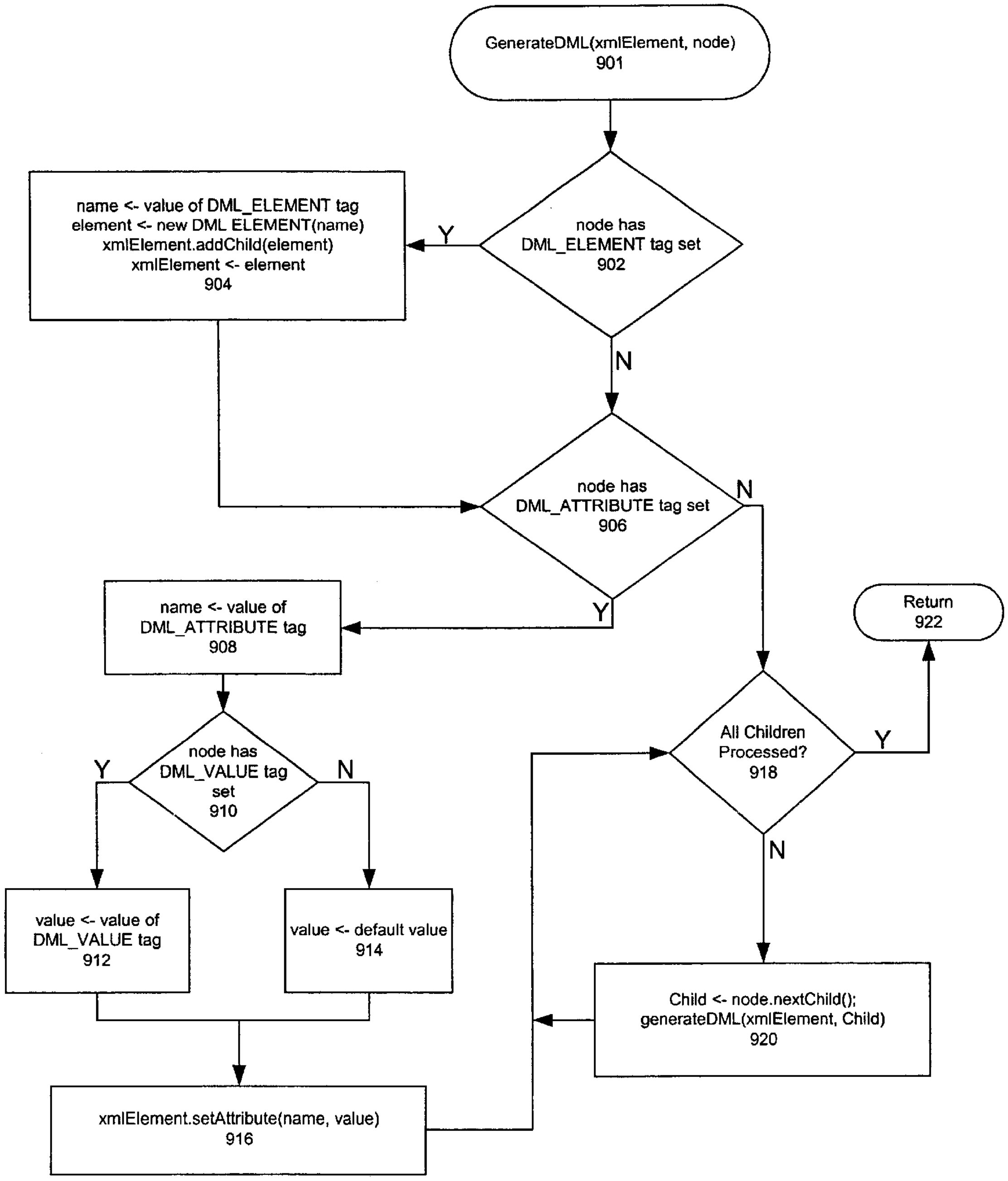
FIG. 9 is a flowchart illustrating DML generation in accordance with one embodiment of the present invention.

As discussed above, the data structure produced by the mapper 220 is an instance of the domain described in the NML document. In one embodiment, this data structure is then used to generate DML. DML Generation is done in a depth-first fashion over the NML Instance tree. FIG. 9 is a flowchart that illustrates the generation 460 of DML.

The output of the mapper 220, described above, is a tree of NML object instances with enumerations in the leaves (actually, in general, it is a collection of such trees, since some maps can "tie" for the best map. Each tree is first pruned by removal of nodes that have no peers and whose descendants have no peers: such nodes cannot generate DML_ELEMENTS, DML_ATTRIBUTES, or DML_VALUES. In one embodiment, at each node in the resulting pruned NML instance tree, the following algorithm is performed:

```
proc generateDML (NMLInstanceNode node) {
    set savedElement = current DML_ELEMENT
    set savedAttribute = current DML_ATTRIBUTE
    if (node is a trigger for a DML CALL) {
        close & output all open DML_ELEMENTS
        set the current DML_ELEMENT to the DML_CALL
    } else if (node has a DML_ELEMENT) {
        set newElement = new DML_ELEMENT with name in
        declaration
        attach newElement to current DML_ELEMENT
        set current DML_ELEMENT to newElement
    } else if (node has a DML_ATTRIBUTE) {
        set newAttribute = named attribute in declaration
        set current Attribute = new Attribute
    }
    if (node is a leaf) {
set the value of the current Attribute to the identifying token
    } else if (node has a DML_VALUE) {
        set the value of the current Attribute to the named value
    }
    foreach child of node {
        generateDML (child)
    }
    close any DML_ELEMENT or ATTRIBUTE created by this node
    set current DML_ELEMENT = savedElement
    set current DML_ATTRIBUTE = savedAttribute
    return;
}
```

The generateDML process is called on each root node of each tree, in turn. Once it has completed on a root node, any open DML elements are closed and output.

4. DML Used to Populate DBMSs, Retrieve Data, and Invoke Programs

Figure 10:
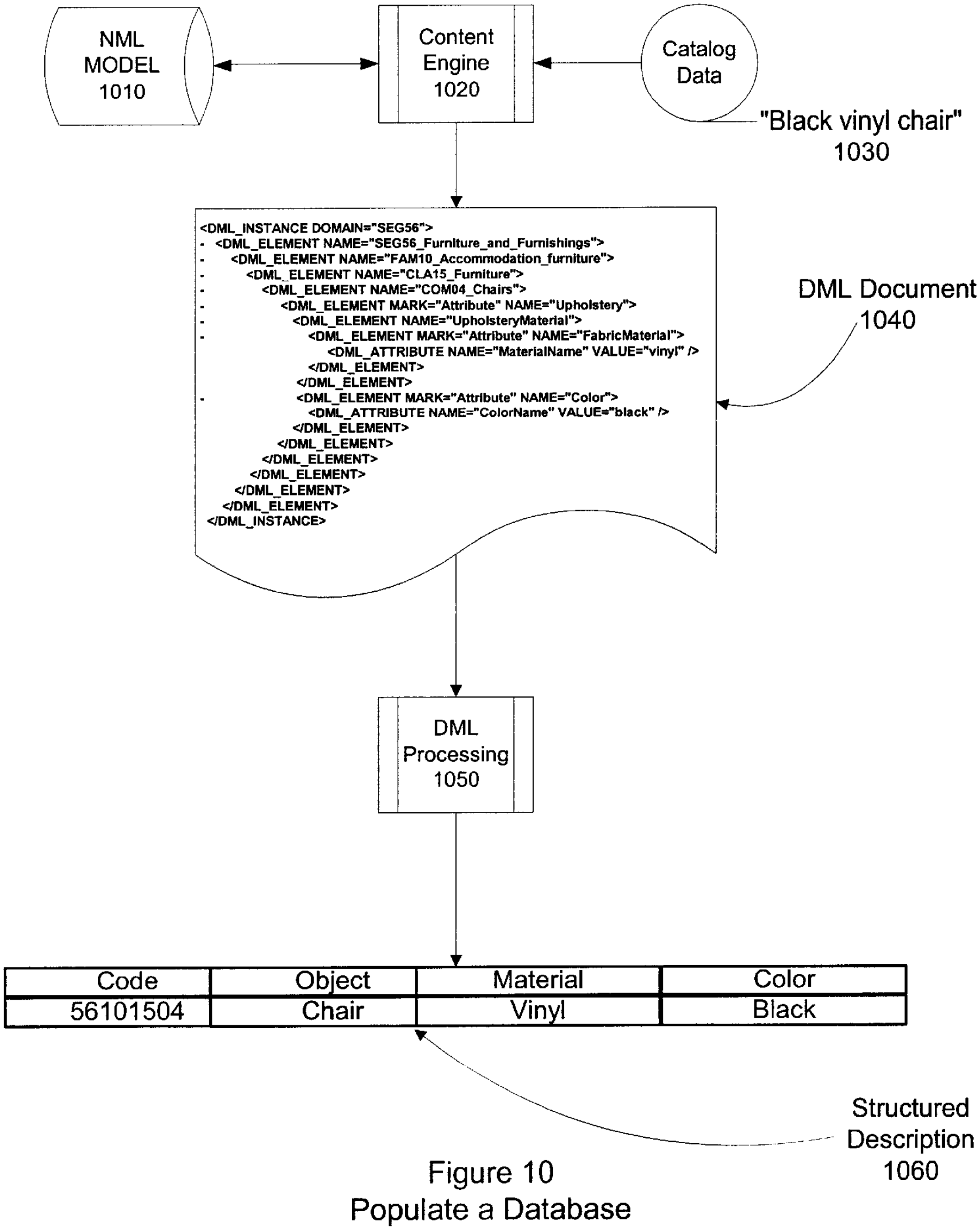
FIG. 10 is a flowchart of a process for populating a database by converting a natural language description into a structured description.
Figure 11:
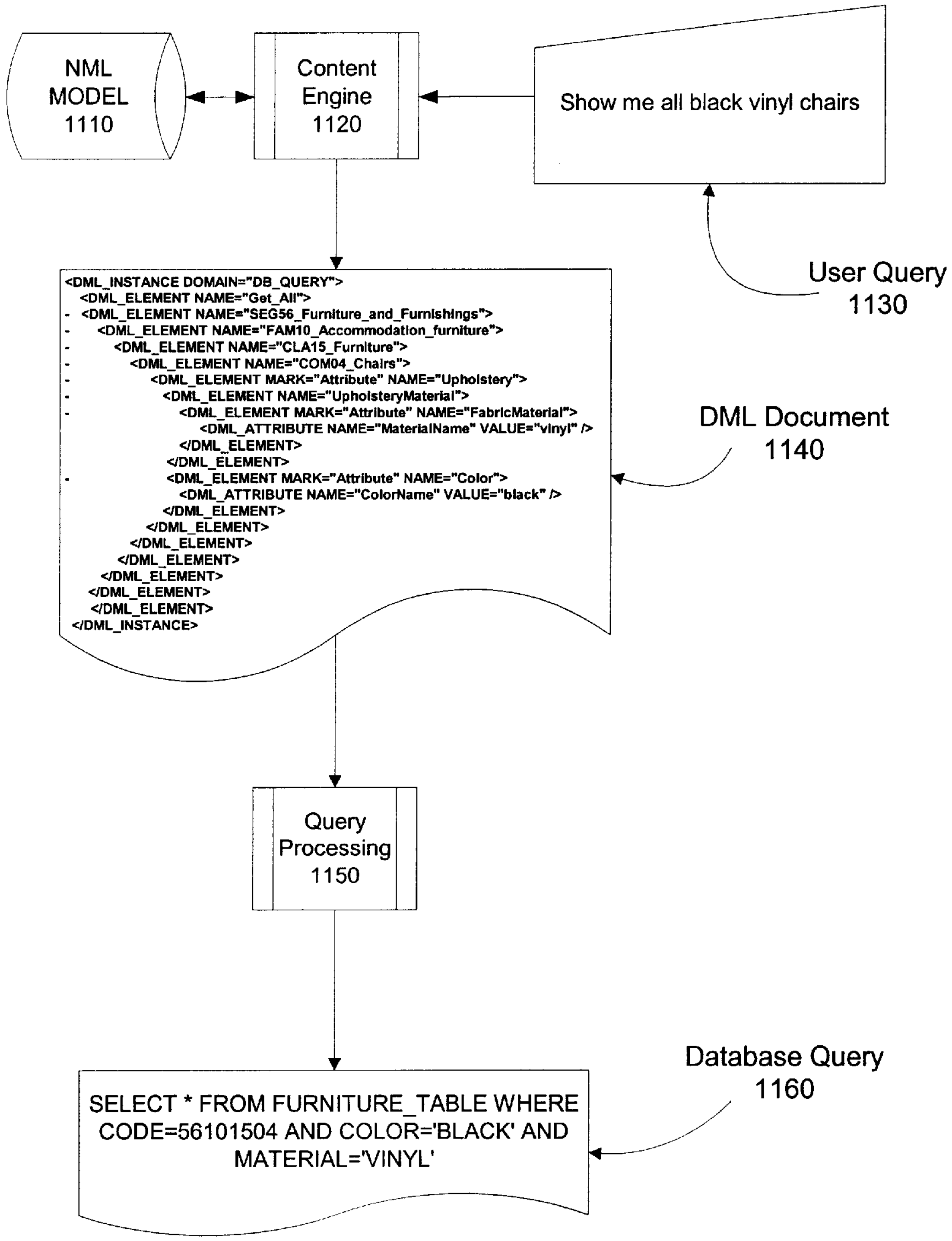
FIG. 11 is a flowchart of a process for retrieving data from a database by converting a natural language request into a structured query.
Figure 12:
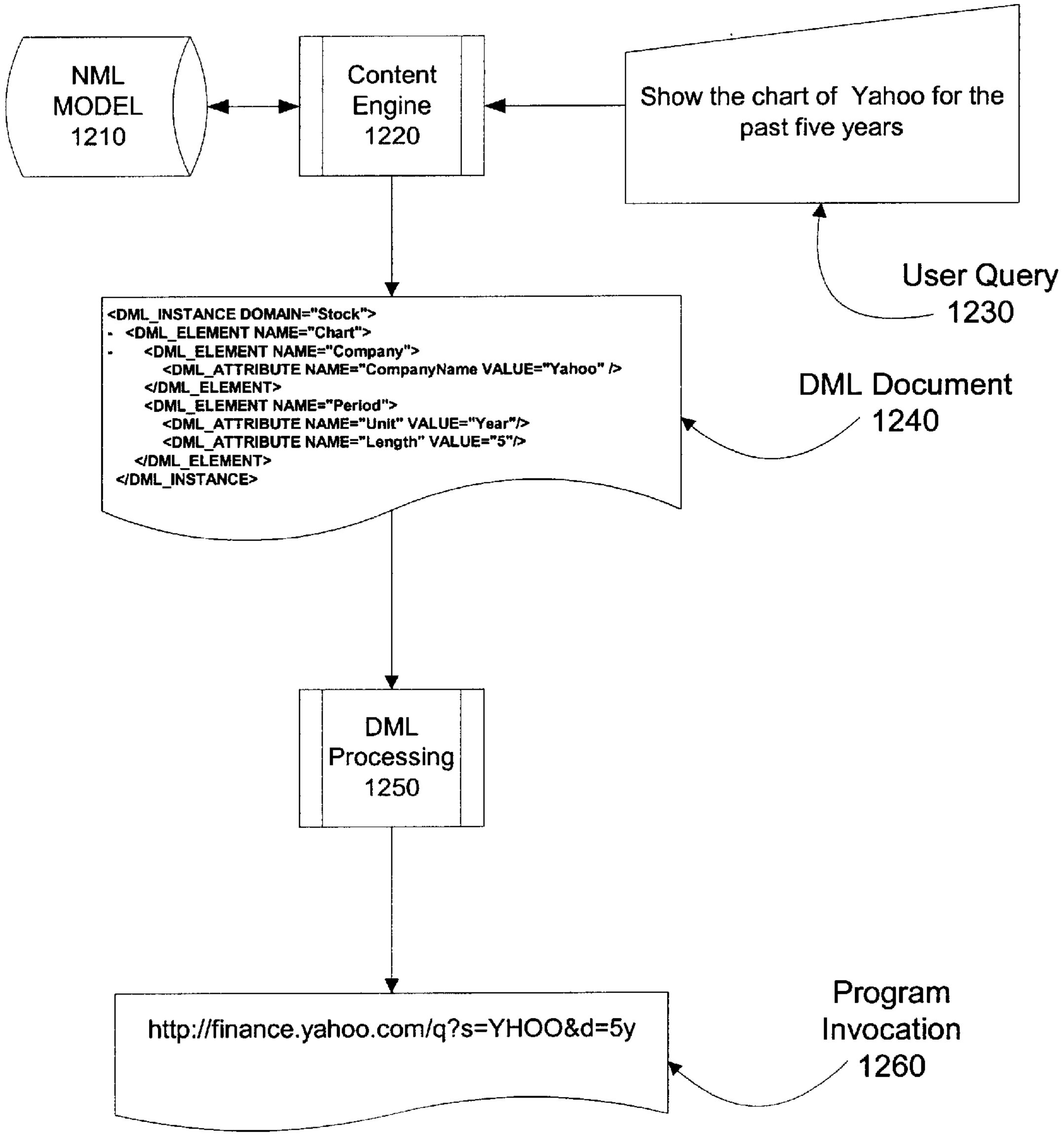
FIG. 12 is a flowchart of a process for invoking a program by converting a natural language request into a program invocation.

Once the DML has been generated, it can be used in a variety of different ways, including populating a database system, retrieving data from a database system or other data store, or invoking a program using the parameters stored in the DML document as parameters to invoke the program. These various applications are illustrated in FIGS. 10–12. In FIG. 10, a description of a "black vinyl chair" 1030 is converted into a structured description 1060. The description is input into the Content Engine 1020, which produces a DML Document 1040. A DML Processing System 1050 then generates the structured description 1060. It will be obvious to one skilled in the art that the tabular form 1060 is suitable for insertion into any database management system, including but not limited to a relational database management system.

In FIG. 11, a natural language request for a "black vinyl chair" 1130 is converted into a structured query 1160. The description is fed into the Content Engine 1120, which produces a DML Document 1140. A DML Processing System 1150 then generates the structured query 1160. The structured query here is shown in the database query language SQL. It will be obvious to one skilled in the art that the DML Processing System 1150 could generate a query in any of a number of database languages, and is not restricted to SQL.

It is noted that here the NML model 1010 and the NML model 1110 are identical: the same model is used for both content creation and content query. This illustrates the flexibility the robustness of the present invention.

In FIG. 12, a natural language request for a stock chart 1230 is converted into a program invocation 1260. The description is fed into the Content Engine 1220, which produces a DML Document 1240. A DML Processing System 1250 then generates the program invocation 1260. The program invocation here is shown as an HTTP cgi request. It will be obvious to one skilled in the art that the DML Processing System 1250 could generate a program invocation in any scripting, web, or API environment, and is not restricted to HTTP requests.

Construction of a DML processing system such as 1050, 1150, or 1250 is site- and application-specific. The major task is traversing the structured DML document 1040, 1140, or 1240, and converting that information into the form required by the application or site. The means of constructing such a system is evident to those familiar with the art.

As will be understood by those familiar with the art, the invention may be embodied in other specific forms without departing from the spirit or essential characteristics thereof. For example, note that the various algorithms are illustrative, and variations are easily implemented. For example, a different cost function could be used to compute the best map, or the pruning step may be left out altogether. Likewise, the particular capitalization or naming of the modules, protocols, features, attributes, data structures, or any other aspect is not mandatory or significant, and the mechanisms that implement the invention or its features may have different names or formats. Further, functionality which is shown or described as being provided by a single module may be provided instead by multiple different modules; likewise functionality provided by multiple modules may be provided instead by lesser or a single module. Further, while a software based embodiment has been described, the functionality of the invention may be embodied in whole or in part in various hardward elements, such as application specific integrated circuits (ASICs) or the like. The particular examples of NML and DML are illustrative, and not limiting. Indeed, given the flexibility of the invention, it is understood that the NML and DML are not limited to the example domains and applications discussed, but may be applied in numerous other domains and embodiments. Accordingly, the disclosure of the present invention is intended to be illustrative, but not limiting, of the scope of the invention, which is set forth in the following claims.

We claim:

1. A method for creating structured data representation from a plain text description for an application domain, given a domain model that defines objects of the application domain and relationships between the objects, and identifies the objects with a vocabulary, the method comprising:

parsing the plain text description using a grammar and the vocabulary to generate a plurality of parse trees, the grammar defined independently of the domain model;

mapping at least some of the parse trees onto the domain model to create a plurality of instance trees; and selecting at least one of the instance trees to create the structured data.

2. The method of claim 1, wherein all possible parse trees for the plain text are generated.

3. The method of claim 1, further comprising:

representing the plurality of parse trees generated in a single directed acyclic graph.

4. The method of claim 1, wherein the grammar used to generate the plurality of parse trees is context-free.

5. The method of claim 1, wherein the vocabulary used is a general vocabulary.

6. The method of claim 1, wherein the vocabulary used is specific to the application domain.

7. The method of claim 1, wherein mapping the plurality of parse trees onto instance trees comprises:

generating a plurality of instance trees based on the domain model;

pruning the plurality of generated instance trees by discarding incomplete instance trees, to create a second plurality of instance trees; and choosing one instance tree from the second plurality of instance trees.

8. The method of claim 7, wherein choosing one instance tree from the second plurality of instance trees comprises:

choosing the instance tree which covers the maximum number of words of plain text.

9. A method for creating structured data representation from a plain text description for an application domain, given a domain model that defines objects of the application domain and relationships between the objects, and identifies the objects with a vocabulary, the method comprising:

parsing the plain text using a grammar and the vocabulary to generate a parse tree, the grammar defined independently of the domain model;

mapping the parse tree onto the domain model to create an instance tree of objects of the application domain;

creating the structured data using the instance tree.

10. A method for creating structured data representation from a plain text description for an application domain, the method comprising:

constructing a domain model which defines objects of the application domain and relationships between the objects, and identifies the objects with a vocabulary;

parsing the plain text using a grammar and the vocabulary to generate a plurality of parse trees, the grammar defined independently of the domain model;

generating, based on the domain model, a plurality of instance trees, each instance tree generated corresponding to a parse tree;

choosing one instance tree from the plurality of instance trees; and generating structured data based on the chosen instance tree.

11. A method for creating structured data representation from a plain text description for an application domain, the method comprising:

constructing a domain model which defines objects of the application domain and relationships between the objects, and identifies the objects with a vocabulary;

parsing the plain text using a grammar and the vocabulary to generate a plurality of parse trees, the grammar defined independently of the domain model;

generating, based on the domain model, a plurality of instance trees, each instance tree generated corresponding to a parse tree;

pruning the plurality of instance trees to create a second plurality of instance trees;

choosing one instance tree from the second plurality of instance trees; and generating structured data based on the chosen instance tree.

12. A computer-implemented system for creating structured data representation from a plain text description for an application domain, the system comprising:

a parser for parsing the plain text using a grammar and a vocabulary to generate a plurality of parse trees, the grammar defined independently of the application domain;

a mapper communicatively coupled to the parser, for mapping the plurality of parse trees onto a domain model to create a plurality of instance trees, the domain model defining objects of the application domain and relationships between the objects and identifying the objects with the vocabulary; and an output simplifier communicatively coupled to the mapper, wherein instructions to the output simplifier are included in the domain model.

13. The system of claim 12, further comprising:

a model storage communicatively coupled to the mapper for providing it with the domain model.

14. The system of claim 12, further comprising:

a grammar storage communicatively coupled to the parser for providing the parser with the grammar.

15. The system of claim 12, further comprising:

a vocabulary storage for storing vocabulary specific to the application.

16. The system of claim 12, further comprising:

a vocabulary storage for storing general vocabulary.

17. The system of claim 12, wherein updating the vocabulary updates the domain model.

18. A computer-implemented system for creating structured data representation from a plain text description for an application domain, the system comprising:

a parser for parsing the plain text using a grammar and a vocabulary to generate a parse tree;

a mapper communicatively coupled to the parser, for mapping the parse tree onto a domain model to create an instance tree, the domain model defining objects of the application domain and relationships between the objects and identifying the objects with the vocabulary, the grammar defined independently of the domain model; and an output simplifier communicatively coupled to the mapper, wherein instructions to the output simplifier are included in the domain model.

19. A computer program product for storing a program for permitting a computer to perform a method for creating structured data representation from a plain text description for an application domain, given a domain model that defines objects of the application domain and relationships between the objects, and identifies the objects with a vocabulary, the method comprising:

parsing the plain text description using a grammar and the vocabulary to generate a plurality of parse trees, the grammar defined independently of the domain model;

mapping at least some of the parse trees onto the domain model to create a plurality of instance trees; and selecting at least one of the instance trees to create the structured data.

20. A computer program product for storing a program for permitting a computer to perform a method for creating structured data representation from a plain text description for an application domain, given a domain model that defines objects of the application domain and relationships between the objects, and identifies the objects with a vocabulary, the method comprising:

parsing the plain text using a grammar and the vocabulary to generate a parse tree, the grammar defined independently of the domain model;

mapping the parse tree onto the domain model to create an instance tree of objects of the application domain; and creating the structured data using the instance tree.

21. A computer program product for storing a program for permitting a computer to perform a method for creating structured data representation from a plain text description for an application domain, the method comprising:

constructing a domain model which defines objects of the application domain and relationships between the objects, and identifies the objects with a vocabulary;

parsing the plain text using a grammar and the vocabulary to generate a plurality of parse trees, the grammar defined independently of the domain model;

generating, based on the domain model, a plurality of instance trees, each instance tree generated corresponding to a parse tree;

choosing one instance tree from the plurality of instance trees; and generating structured data based on the chosen instance tree.

22. A computer program product for storing a program for permitting a computer to perform a method for creating structured data representation from a plain text description for an application domain, the method comprising:

constructing a domain model which defines objects of the application domain and relationships between the objects, and identifies the objects with a vocabulary;

parsing the plain text using a grammar and the vocabulary to generate a plurality of parse trees, the grammar defined independently of the domain model;

generating, based on the domain model, a plurality of instance trees, each instance tree generated corresponding to a parse tree;

pruning the plurality of instance trees to create a second plurality of instance trees;

choosing one instance tree from the second plurality of instance trees; and generating structured data based on the chosen instance tree.

23. A computer-implemented system for creating structured data representation from a plain text description for an application domain, the system comprising:

a content engine comprising:

a parser for parsing the plain text using a grammar and a vocabulary to generate a plurality of parse trees;

a mapper communicatively coupled to the parser, for mapping the plurality of parse trees onto a domain model to create a plurality of instance trees, the grammar defined independently of the domain model; and an output simplifier communicatively coupled to the mapper, wherein instructions to the output simplifier are included in the domain model;

a grammar storage communicatively coupled to the content engine for providing the content engine with the grammar;

a model storage communicatively coupled to the content engine for providing the content engine with the domain model which defines objects of the application domain and relationships between the objects, and identifies the objects with a vocabulary; and a vocabulary storage for providing the content engine with the vocabulary.

* * * * *